(12) United States Patent
Takahashi

(10) Patent No.: US 10,924,196 B2
(45) Date of Patent: Feb. 16, 2021

(54) RECEPTION APPARATUS, RECEPTION METHOD, TRANSMISSION APPARATUS, AND TRANSMISSION METHOD

(71) Applicant: SONY SEMICONDUCTOR SOLUTIONS CORPORATION, Atsugi (JP)

(72) Inventor: Kazuyuki Takahashi, Chiba (JP)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 0 days.

(21) Appl. No.: 16/332,121

(22) PCT Filed: Oct. 26, 2017

(86) PCT No.: PCT/JP2017/038707
§ 371 (c)(1),
(2) Date: Mar. 11, 2019

(87) PCT Pub. No.: WO2018/088225
PCT Pub. Date: May 17, 2018

(65) Prior Publication Data
US 2019/0222331 A1 Jul. 18, 2019

(30) Foreign Application Priority Data
Nov. 9, 2016 (JP) ................. 2016-219057

(51) Int. Cl.
*H03K 9/00* (2006.01)
*H04H 40/27* (2008.01)
(Continued)

(52) U.S. Cl.
CPC .............. *H04H 40/27* (2013.01); *H04B 1/16* (2013.01); *H04H 20/59* (2013.01); *H04H 60/13* (2013.01);
(Continued)

(58) Field of Classification Search
CPC ........ H04H 40/27; H04H 20/59; H04H 60/13; H04H 60/43; H04W 4/90; H04B 1/16;
(Continued)

(56) References Cited

U.S. PATENT DOCUMENTS

2015/0095943 A1 * 4/2015 Lee ...................... H04L 1/0045
725/33
2016/0094895 A1 3/2016 Stadelmeier et al.
(Continued)

FOREIGN PATENT DOCUMENTS

EP 3 048 794 A1 7/2016
JP 2008-148230 A 6/2008
(Continued)

OTHER PUBLICATIONS

Extended European Search Report dated Oct. 25, 2019 in European Patent Application No. 17869967.4, 7 pages.
(Continued)

*Primary Examiner* — Zewdu A Kassa
(74) *Attorney, Agent, or Firm* — Oblon, McClelland, Maier & Neustadt, L.L.P.

(57) ABSTRACT

The present technology relates to a reception apparatus, a reception method, a transmission apparatus, and a transmission method permitting provision of an emergency warning service more suited to actual operation.
Provided is a reception apparatus including a reception section and a demodulation section. The reception section receives a physical layer frame transported as a broadcast signal on the basis of monitoring information that is included in upper layer signalling, signalling in a layer higher than a physical layer, and that is used to monitor a specific service. The demodulation section demodulates physical layer signalling acquired from the physical layer frame and monitors whether emergency warning informa-
(Continued)

tion has been transported on the basis of emergency warning notice information acquired as a result of the demodulation. In the case where the emergency warning notice information indicates that the emergency warning information has been transported, the reception apparatus starts up automatically. The present technology is applicable, for example, to a transport system for transporting a physical layer frame compliant with the DVB-T2 standard.

19 Claims, 16 Drawing Sheets

(51) Int. Cl.
| | | |
|---|---|---|
| *H04H 20/59* | (2008.01) | |
| *H04B 1/16* | (2006.01) | |
| *H04N 21/41* | (2011.01) | |
| *H04N 21/442* | (2011.01) | |
| *H04H 60/13* | (2008.01) | |
| *H04N 21/426* | (2011.01) | |
| *H04H 60/43* | (2008.01) | |
| *H04N 21/438* | (2011.01) | |
| *H04N 21/443* | (2011.01) | |
| *H04N 21/6543* | (2011.01) | |
| *H04N 21/81* | (2011.01) | |
| *H04W 4/90* | (2018.01) | |

(52) U.S. Cl.
CPC ............ *H04H 60/43* (2013.01); *H04N 21/41* (2013.01); *H04N 21/42615* (2013.01); *H04N 21/4383* (2013.01); *H04N 21/442* (2013.01); *H04N 21/4432* (2013.01); *H04N 21/4436* (2013.01); *H04N 21/6543* (2013.01); *H04N 21/814* (2013.01); *H04W 4/90* (2018.02)

(58) Field of Classification Search
CPC ............ H04N 21/41; H04N 21/42615; H04N 21/4383; H04N 21/442; H04N 21/4432
USPC ........................................ 375/316, 219, 295
See application file for complete search history.

(56) References Cited

U.S. PATENT DOCUMENTS

| | | |
|---|---|---|
| 2016/0192034 A1 | 6/2016 | Yamane et al. |
| 2016/0211931 A1 | 7/2016 | Takahashi et al. |
| 2017/0132907 A1* | 5/2017 | Lee ................ G08B 21/02 |
| 2017/0164070 A1* | 6/2017 | Yang ................ H04H 20/59 |
| 2017/0201337 A1 | 7/2017 | Michael et al. |

FOREIGN PATENT DOCUMENTS

| | | |
|---|---|---|
| JP | 2015-80172 A | 4/2015 |
| WO | WO 2016/006472 A1 | 1/2016 |
| WO | WO 2016/068564 A1 | 5/2016 |

OTHER PUBLICATIONS

DVB Organization: "TM-T0079rl_161031FH_Telco_Primer_for_EWS_Telco_on_161031pdf.paf", Emergency Warning System-inserting (a) corresponding alert flag(s) into DVB-T2 Primer for second telco on Oct. 13, 2016, XP017852378, 18 pages.

International Search Report dated Jan. 23, 2018 in PCT/JP2017/038707 filed on Oct. 26, 2017.

"Digital Video Broadcasting (DVB); Frame structure channel coding and modulation for a second generation digital terrestrial television broadcasting system (DVB-T2)", EBU Operating Eurovision, ETSI EN 302 755 V1.4.1 (Jul. 2015), 188 pages.

\* cited by examiner

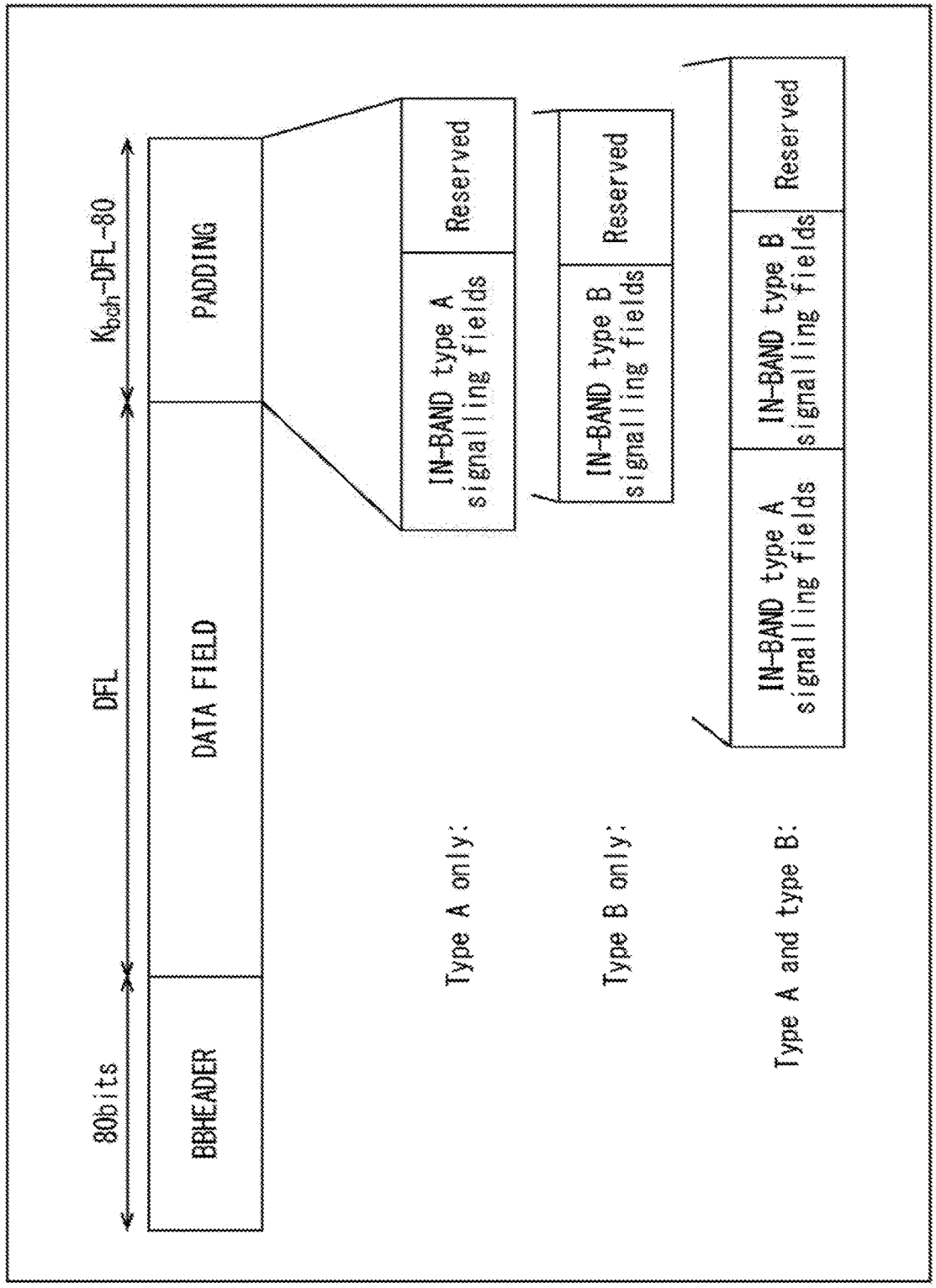

FIG.8

Padding field mapping for in-band type A

| Field | Size |
|---|---|
| PADDING_TYPE ('00') | 2bits |
| PLP_L1_CHANGE_COUNTER | 8bits |
| RESERVED_1 | 8bits |
| For j=0..P$_I$-1 { | |
|    SUB_SLICE_INTERVAL | 22bits |
|    START_RF_IDX | 3bits |
|    CURRENT_PLP_START | 22bits |
|    RESERVED_2 | 8bits |
| } | |
| CURRENT_PLP_NUM_BLOCKS | 10bits |
| NUM_OTHER_PLP_IN_BAND | 8bits |
| For i=0..NUM_OTHER_PLP_IN_BAND-1 { | |
|    PLP_ID | 8bits |
|    PLP_START | 22bits |
|    PLP_NUM_BLOCKS | 10bits |
|    RESERVED_3 | 8bits |
| } | |
| For j=0..P$_I$-1 { | |
|    TYPE_2_START | 22bits |
| } | |

FIG.9

| Padding field mapping for in-band type B | |
|---|---|
| Field | Size |
| PADDING_TYPE ('01') | 2bits |
| TTO | 31bits |
| FIRST_ISCR | 22bits |
| BUFS_UNIT | 2bits |
| BUFS | 10bits |
| TS_RATE | 27bits |
| RESERVED_B | 8bits |

FIG. 10

L1-post Configurable RESERVED_2

| Syntax | No of bits | Semantics |
|---|---|---|
| EMERGENCY_WARNING | 1 | EMERGENCY WARNING NOTICE INFORMATION (EMERGENCY WARNING FLAG) |
| EWS_VERSION | 5 | VERSION OF EMERGENCY WARNING INFORMATION |
| SERVICE_ID | 16 | SERVICE ID TO TUNE TO AFTER AUTOMATIC STARTUP |
| EWS_CODE | 8 | TYPE CODE OF EMERGENCY WARNING |

AUX_PRIVATE_CONF (AUX_STREAM_TYPE=1111 (Emergency Signalling))

| Syntax | No of bits | Semantics |
|---|---|---|
| AUX_PRIVATE_CONF { | | |
| COUNTRY_CODE | 16 | COUNTRY CODE (ISO2 BYTECODE, ISO 3166-1 alpha-2) |
| REGION_CODE | 8 | DOMESTIC REGION CODE |
| RESERVED | 4 | FUTURE EXPANSION |
| } | | |

FIG. 11

| Syntax | No of bits | Semantics |
|---|---|---|
| EA_monitor_descriptor ( | | |
| descriptor_tag | 8 | TAG VALUE OF EMERGENCY WARNING MONITOR DESCRIPTOR |
| descriptor_length | 8 | LENGTH OF EMERGENCY WARNING MONITOR DESCRIPTOR |
| version | 8 | VERSION OF EMERGENCY WARNING MONITOR DESCRIPTOR |
| num_EA_service | 8 | NUMBER OF EMERGENCY WARNING SERVICES |
| for (i=0; i < num_EA_service; i++) { | | |
| frequency | 32 | FREQUENCY AT WHICH TO MONITOR EMERGENCY WARNING INFORMATION (MHz 4-BIT BCD) |
| transport_stream_id | 16 | Transport_Stream_ID TO SELECT AFTER AUTOMATIC STARTUP |
| plp_id | 8 | PLP_ID TO TUNE TO AFTER AUTOMATIC STARTUP |
| service_id | 16 | SERVICE ID TO TUNE TO AFTER AUTOMATIC STARTUP |
| } | | |
| expire_flag | 1 | FLAG INDICATING EMERGENCY WARNING MONITOR DESCRIPTOR HAS EXPIRATION DATE |
| reserved | 7 | FUTURE EXPANSION |
| if(expire_flag == 1) { | | |
| expire_date_UTC | 64 | EXPIRATION DATE OF EMERGENCY WARNING MONITOR DESCRIPTOR |
| } | | |
| } | | |

FIG. 12

| Syntax | No of bits | Semantics |
|---|---|---|
| EA_monitor_descriptor ( | | |
| descriptor_tag | 8 | TAG VALUE OF EMERGENCY WARNING MONITOR DESCRIPTOR |
| descriptor_length | 8 | LENGTH OF EMERGENCY WARNING MONITOR DESCRIPTOR |
| version | 8 | VERSION OF EMERGENCY WARNING MONITOR DESCRIPTOR |
| num_EA_service | 8 | NUMBER OF EMERGENCY WARNING SERVICES |
| for(i=0; i < num_EA_service; i++) { | | |
| frequency | 32 | FREQUENCY AT WHICH TO MONITOR EMERGENCY WARNING INFORMATION (MHz 4-BIT BCD) |
| transport_stream_id | 16 | Transport_Stream_ID TO SELECT AFTER AUTOMATIC STARTUP |
| plp_id | 8 | PLP_ID TO TUNE TO AFTER AUTOMATIC STARTUP |
| service_id | 16 | SERVICE ID TO TUNE TO AFTER AUTOMATIC STARTUP |
| url_length | 16 | URL INFORMATION LENGTH |
| for(j=0; j < url_length; j++) { | | |
| url_char | 8 | URL INFORMATION TO SELECT AFTER AUTOMATIC STARTUP |
| } | | |
| } | | |
| expire_flag | 1 | FLAG INDICATING EMERGENCY WARNING MONITOR DESCRIPTOR HAS EXPIRATION DATE |
| reserved | 7 | FUTURE EXPANSION |
| if(expire_flag == 1) { | | |
| expire_date_UTC | 64 | EXPIRATION DATE OF EMERGENCY WARNING MONITOR DESCRIPTOR |
| } | | |
| } | | |

RECEPTION APPARATUS, RECEPTION METHOD, TRANSMISSION APPARATUS, AND TRANSMISSION METHOD

TECHNICAL FIELD

The present technology relates to a reception apparatus, a reception method, a transmission apparatus, and a transmission method and relates more particularly to a reception apparatus, a reception method, a transmission apparatus, and a transmission method that permit provision of an emergency warning service more suited to actual operation.

BACKGROUND ART

The DVB-T (Digital Video Broadcasting-Terrestrial) standard has been adopted not only in Europe but across the world as a digital terrestrial broadcasting standard. Further, at present, the DVB-T2 standard, a revised version of this DVB-T standard, has become commercial (refer, for example, to NPL 1).

Also, an emergency warning system (EWS) is prescribed as means for conveying a warning in the event of an emergency such as natural disasters represented by earthquake and tsunami (refer, for example, to PTL 1).

CITATION LIST

Patent Literature

[PTL 1]
Japanese Patent Laid-Open No. 2008-148230

Non Patent Literature

[NPL 1]
ETSI EN 302 755 V1.4.1 (2015-July)

SUMMARY

Technical Problems

Incidentally, although an emergency warning system has been introduced to the DVB-T2 standard and other broadcasting schemes, there is a demand to provide an emergency warning service more suited to actual operation, and proposals have been requested to realize such an emergency warning system.

The present technology has been devised in light of such circumstances, and it is an object of the present technology to allow provision of an emergency warning service more suited to actual operation.

Solution to Problems

A reception apparatus of a first aspect of the present technology includes a reception section and a demodulation section. The reception section receives a physical layer frame transported as a broadcast signal on a basis of monitoring information that is included in upper layer signalling, signalling in a layer higher than a physical layer, and that is used to monitor a specific service. The demodulation section demodulates physical layer signalling acquired from the physical layer frame and monitors whether emergency warning information has been transported on a basis of emergency warning notice information acquired as a result of the demodulation. In a case where the emergency warning notice information indicates that the emergency warning information has been transported, the reception apparatus starts up automatically.

The reception apparatus of the first aspect of the present technology may be an independent apparatus or an internal block included in a single apparatus. Also, a reception method of the first aspect of the present technology is a reception method corresponding to the reception apparatus of the first aspect of the present technology described above.

In the reception apparatus and the reception method of the first aspect of the present technology, a physical layer frame transported as a broadcast signal is received on a basis of monitoring information that is included in upper layer signalling, signalling in a layer higher than a physical layer, and that is used to monitor a specific service, and physical layer signalling acquired from the physical layer frame is demodulated, and whether emergency warning information has been transported is monitored on a basis of emergency warning notice information acquired as a result of the demodulation, and in a case where the emergency warning notice information indicates that the emergency warning information has been transported, the reception apparatus starts up automatically.

A transmission apparatus of a second aspect of the present technology includes a generation section and a transmission section. The generation section generates a physical layer frame including physical layer signalling and including, in a data portion thereof, upper layer signalling, signalling in a layer higher than the physical layer. The transmission section transmits the physical layer frame as a broadcast signal. The physical layer signalling includes emergency warning notice information corresponding to whether emergency warning information has been transported, and the upper layer signalling includes monitoring information for monitoring a specific service.

The transmission apparatus of the second aspect of the present technology may be an independent apparatus or an internal block included in a single apparatus. Also, a transmission method of the second aspect of the present technology is a transmission method corresponding to the transmission apparatus of the second aspect of the present technology described above.

In the transmission apparatus and the transmission method of the second aspect of the present technology, a physical layer frame is generated that includes physical layer signalling and that includes, in a data portion thereof, upper layer signalling as signalling in a layer higher than the physical layer. The physical layer signalling includes emergency warning notice information corresponding to whether emergency warning information has been transported. The upper layer signalling includes monitoring information for monitoring a specific service. The physical layer frame is transmitted as a broadcast signal.

Advantageous Effect of Invention

According to the first and second aspects of the present technology, an emergency warning service more suited to actual operation can be provided.

It should be noted that the effects described herein are not necessarily limited and may be any of the effects described in this disclosure.

BRIEF DESCRIPTION OF DRAWINGS

FIG. 7 is a diagram illustrating a structure in the case where a padding field of a BB frame is used as IN-BAND signalling.

FIG. 8 is a diagram illustrating a syntax of type A IN-BAND signalling.

FIG. 9 is a diagram illustrating a syntax of type B IN-BAND signalling.

FIG. 10 is a diagram illustrating an example of bit assignment.

FIG. 11 is a diagram illustrating an example of a syntax of an emergency warning monitor descriptor.

FIG. 12 is a diagram illustrating an example of a syntax of an emergency warning monitor descriptor.

DESCRIPTION OF EMBODIMENTS

A description will be given below of an embodiment of the present technology with reference to drawings. It should be noted that the description will be given in the following order:
1. System Configuration
2. Overview of the Present Technology
3. Physical Layer Signalling
(1) L1-Post Signalling
(2) IN-BAND Signalling
4. Specific Example of Bit Assignment
5. Upper Layer Signalling
6. Flow of the Emergency Warning Information Response Processes
7. Modification Example
8. Configuration of the Computer 1. System Configuration (Configuration Example of the Transport System)

Figure 1:
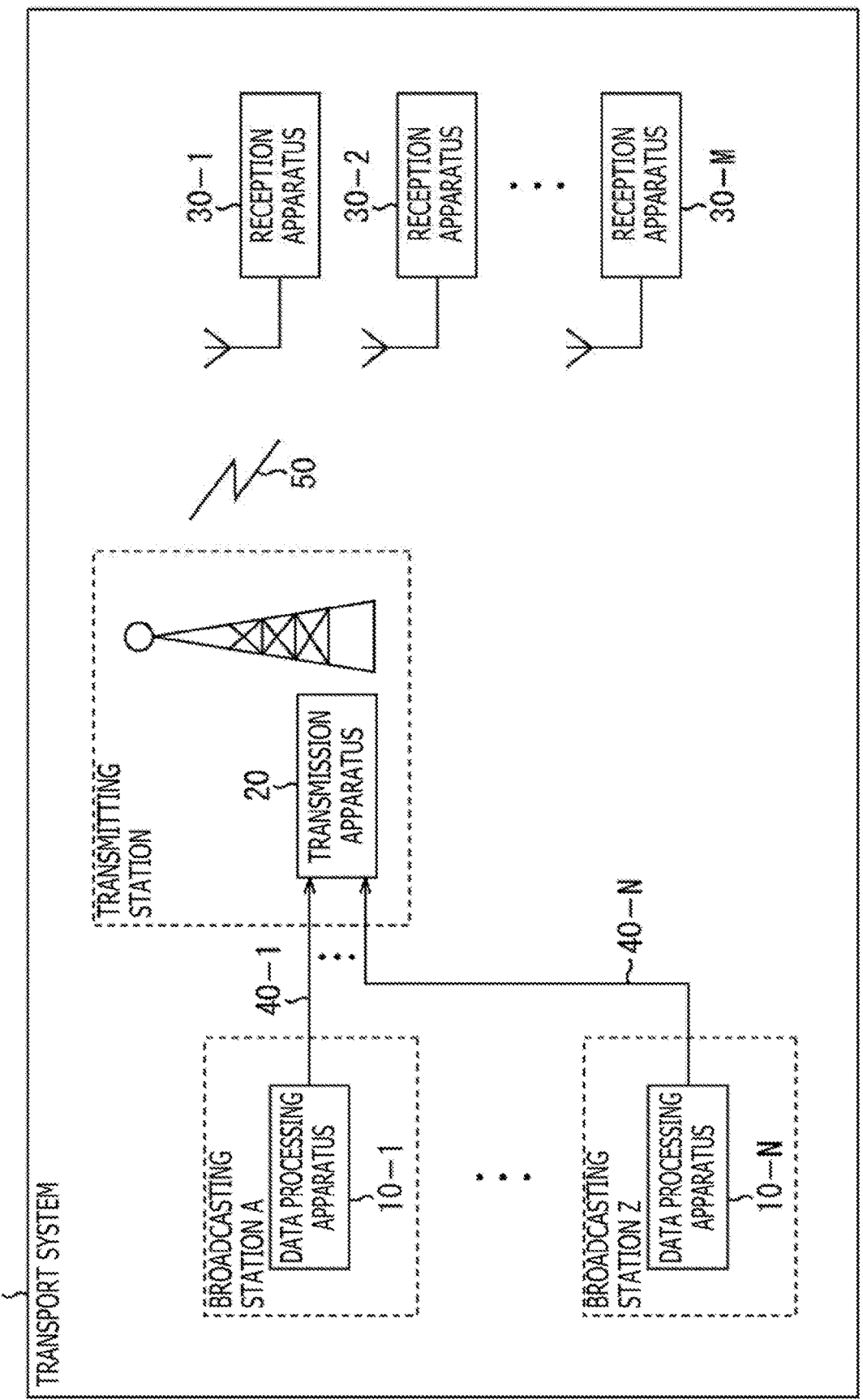
FIG. 1 is a block diagram illustrating a configuration of an embodiment of a transport system to which the present technology is applied.

FIG. 1 is a block diagram illustrating a configuration of an embodiment of a transport system to which the present technology is applied. It should be noted that a system refers to a logical set of a plurality of apparatuses.

In FIG. 1, a transport system 1 includes data processing apparatuses 10-1 to 10-N (where N is an integer equal to or larger than 1) installed in facilities related to respective broadcasting stations, a transmission apparatus 20 installed at a transmitting station, and reception apparatuses 30-1 to 30-M (where M is an integer equal to or larger than 1) owned by users.

Also, in this transport system 1, the data processing apparatuses 10-1 to 10-N are connected to the transmission apparatus 20 via communication lines 40-1 to 40-N. It should be noted that leased lines, for example, can be used as the communication lines 40-1 to 40-N.

The data processing apparatus 10-1 processes content such as broadcast program produced by a broadcasting station A and transmits data to be transported acquired as a result thereof to the transmission apparatus 20 via the communication line 40-1.

In the data processing apparatuses 10-2 to 10-N, content such as broadcast programs produced by broadcasting stations B to Z is processed, and data to be transported acquired as a result thereof is sent to the transmission apparatus 20 via the communication lines 40-2 to 40-N as in the data processing apparatus 10-1.

The transmission apparatus 20 receives transported data sent from the data processing apparatuses 10-1 to 10-N on the side of the broadcasting stations via the communication lines 40-1 to 40-N. The transmission apparatus 20 processes transported data from the data processing apparatuses 10-1 to 10-N and transmits a broadcast signal acquired as a result thereof from a transmitting antenna installed at the transmitting station.

This allows the broadcast signal from the transmission apparatus 20 on the side of the transmitting station to be sent to the reception apparatuses 30-1 to 30-M via a broadcast transport channel 50.

The reception apparatuses 30-1 to 30-M are stationary receivers such as TV receivers, set top boxes (STBs), recorders, gaming consoles, and network storages or mobile receivers such as smartphones, mobile phones, and tablet computers. Also, the reception apparatuses 30-1 to 30-M may be vehicle-mounted equipment mounted to vehicles such as vehicle-mounted TV receivers or wearable computers such as head-mounted displays (HMDs).

The reception apparatus 30-1 reproduces content such as broadcast program corresponding to tuning operation performed by a user by receiving a broadcast signal sent from the transmission apparatus 20 via the broadcast transport channel 50 and processing the signal.

In the reception apparatuses 30-2 to 30-M, a broadcast signal from the transmission apparatus 20 is processed, and content corresponding to tuning operation performed by a user is reproduced as in the reception apparatus 30-1.

It should be noted that, in the transport system 1, the broadcast transport channel 50 may be not only terrestrial (terrestrial broadcasting) but also, for example, satellite broadcasting using a broadcasting satellite (BS) or a communications satellite (CS) or wired broadcasting using cables (CATV: Common Antenna Television).

Also, in the transport system 1, although not illustrated, various servers may be connected to a communication line such as the Internet so that the reception apparatuses 30-1 to 30-M having a communication function can receive various pieces of data such as content and applications by accessing the various servers for bidirectional communication.

It should be noted that in the case where there is no particular need to distinguish between the data processing apparatuses 10-1 to 10-N on the side of the broadcasting stations, the data processing apparatuses 10-1 to 10-N will be referred to as the data processing apparatuses 10. Also, in the case where there is no particular need to distinguish between the reception apparatuses 30-1 to 30-M, the reception apparatuses 30-1 to 30-M will be referred to as the reception apparatuses 30.

(Configurations of the Apparatuses on the Transmitting Side)

Figure 2:
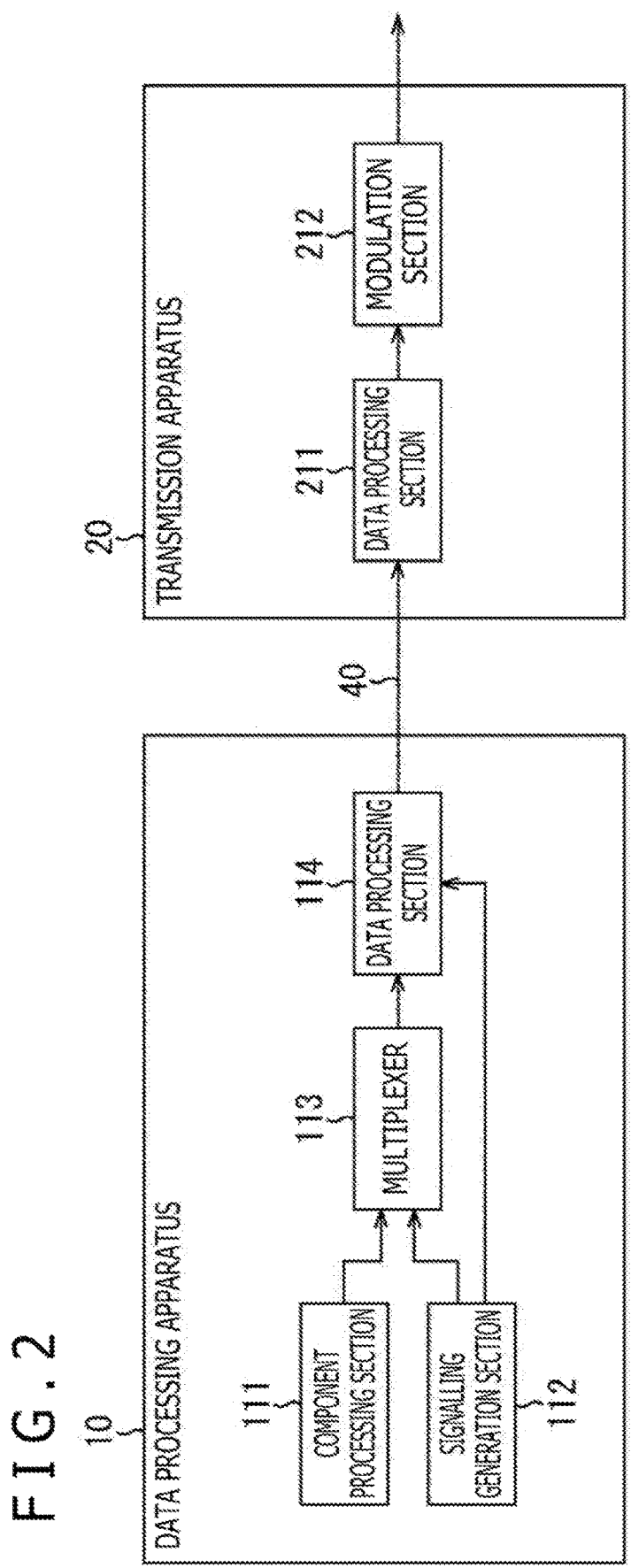
FIG. 2 is a block diagram illustrating a configuration example of a data processing apparatus and a transmission apparatus illustrated in FIG. 1.

FIG. 2 is a block diagram illustrating a configuration example of the data processing apparatus 10 and the transmission apparatus 20 illustrated in FIG. 1.

In FIG. 2, the data processing apparatus 10 includes a component processing section 111, a signalling generation section 112, a multiplexer 113, and a data processing section 114.

The component processing section 111 processes component data included in content such as broadcast programs and supplies a component stream acquired as a result thereof to the multiplexer 113. Here, component data is video, audio, subtitle, and other data, and a coding process compliant with a given coding scheme or other process, for example, is performed on these pieces of data.

The signalling generation section 112 generates signalling used for upper layer processes such as content tuning and reproduction and supplies signalling to the multiplexer 113. Also, the signalling generation section 112 generates signalling used for physical layer processes such as modulation and demodulation of broadcast signal and supplies signalling to the data processing section 114.

It should be noted that signalling is also referred to as control information. Also, in the description given below, of signalling, that used for the processes in the physical layer will be referred to as physical layer signalling (L1 signalling), and that used for processes in upper layers above the physical layer will be referred to as upper layer signalling for distinction.

The multiplexer 113 multiplexes a component stream supplied from the component processing section 111 and an upper layer signalling stream supplied from the signalling generation section 112 and supplies the stream acquired as a result thereof to the data processing section 114. It should be noted here that other streams such as application or time information may be multiplexed.

The data processing section 114 processes the stream supplied from the multiplexer 113 and generates a packet (frame) in a given format. Also, the data processing section 114 generates data to be transported by processing the packet in the given format and physical layer signalling from the signalling generation section 112 and transmits the data to be transported to the transmission apparatus 20 via the communication line 40.

In FIG. 2, the transmission apparatus 20 includes a data processing section 211 and a modulation section 212.

The data processing section 211 receives and processes the transported data sent from the data processing apparatus 10 via the communication line 40 and extracts the packet (frame) in the given format and physical layer signalling information acquired as a result thereof.

The data processing section 211 generates a physical layer frame compliant with a given broadcasting scheme (e.g., DVB-T2 standard) (physical layer frame) by processing the packet (frame) in the given format and physical layer signalling information and supplies the physical layer frame to the modulation section 212.

It should be noted that although a description is given in the configuration illustrated in FIG. 2 assuming that physical layer signalling is generated on the side of the data processing apparatuses 10 and sent to the transmission apparatus 20, physical layer signalling may be generated on the side of the transmission apparatus 20.

The modulation section 212 performs a necessary process (e.g., modulation process) on the physical layer frame supplied from the data processing section 211 and transmits a broadcast signal (RF signal) acquired as a result thereof from the transmitting antenna installed at the transmitting station.

The data processing apparatuses 10 and the transmission apparatus 20 are configured as described above.

(Configuration of the Apparatuses on the Receiving Side)

Figure 3:
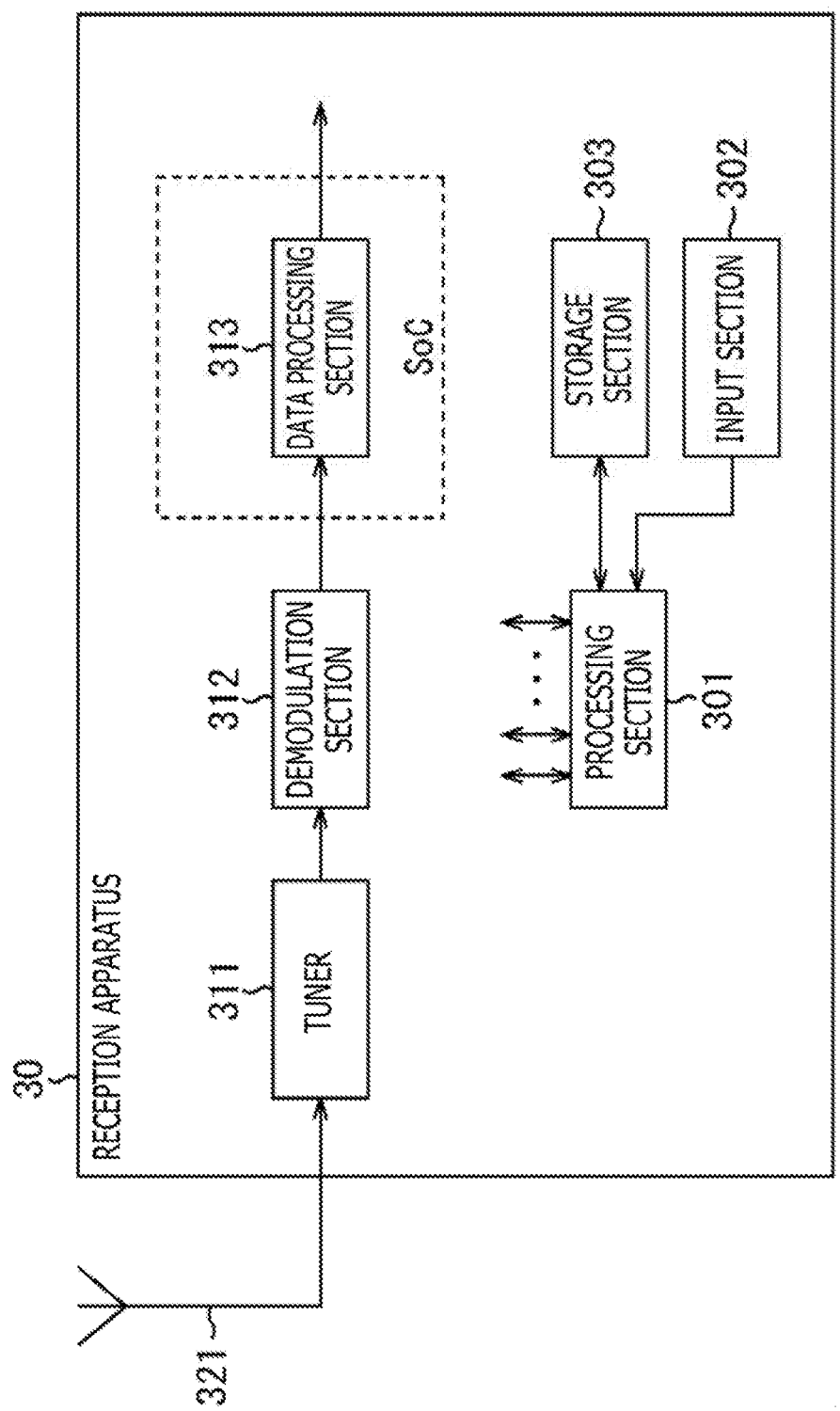
FIG. 3 is a block diagram illustrating a configuration example of a reception apparatus illustrated in FIG. 1.

FIG. 3 is a block diagram illustrating a configuration example of the reception apparatus 30 illustrated in FIG. 1.

In FIG. 3, the reception apparatus 30 includes a processing section 301, an input section 302, a storage section 303, a tuner 311, a demodulation section 312, and a data processing section 313.

The processing section 301 is configured, for example, as a CPU (Central Processing Unit) or a microprocessor. The processing section 301 operates as a central processing apparatus of the reception apparatus 30 that handles various arithmetic operations and controls the operation of each section. The processing section 301 can exchange various pieces of data with each section of the reception apparatus 30.

The input section 302 is, for example, a physical button and supplies an operation signal corresponding to user operation to the processing section 301. The processing section 301 controls the operation of each section on the basis of the operation signal supplied from the input section 302.

The storage section 303 includes, for example, a semiconductor memory such as an NVRAM (Non-Volatile RAM). The storage section 303 stores various types of data under control of the processing section 301.

The tuner 311 performs a necessary process on the broadcast signal (RF signal) received via an antenna 321 and supplies the signal acquired as a result thereof to the demodulation section 312.

The demodulation section 312 is configured, for example, as a demodulator such as a demodulating LSI (Large Scale Integration). The demodulation section 312 performs a demodulation process on the signal supplied from the tuner 311. In this demodulation process, for example, a physical layer frame is processed, for example, in accordance with physical layer signalling, and a packet in a given format is acquired. The packet acquired as a result of this demodulation is supplied to the data processing section 313.

The data processing section 313 is configured, for example, as a system-on-chip (SoC). The data processing section 313 performs given processes on the packet supplied from the demodulation section 312. Here, for example, stream decoding and reproduction processes are performed on the basis of upper layer signalling acquired from the packet.

Video, audio, subtitle, and other data acquired by the processes performed by the data processing section 313 is output to circuits at later stages. This allows content such as broadcast programs to be reproduced and video and audio thereof to be output by the reception apparatuses 30.

It should be noted that although, for convenience of description, the processing section 301 and the data processing section 313 were described as separate blocks in the configuration illustrated in FIG. 3, the processing section 301 and the data processing section 313 may be a processing section that includes a single block.

The reception apparatuses 30 are configured as described above.

2. Overview of the Present Technology

Incidentally, people's lives are exposed to a variety of events such as natural disasters including earthquake, tsunami, typhoon, torrential rain, tornado, flood, and forest fire.

In the event of such an event, it is necessary to prompt people to evacuate by notifying them of emergency warning information as soon as possible. Emergency warning information at the time of a disaster is provided, for example, by a governmental organization and so on.

Also, this emergency warning information can be provided to users as an emergency warning service by using an emergency warning system (EWS) prescribed in various broadcasting schemes such as the DVB-T2 standard, the ISDB-T (Integrated Services Digital Broadcasting-Terrestrial) standard, and the ATSC (Advanced Television Systems Committee) 3.0 standard.

In operating this emergency warning system (EWS), it is common, in the case where the receiver is in standby mode (in standby mode), to monitor whether emergency warning information has been transported, and if so, to start up the receiver automatically so that emergency warning information is presented.

On the other hand, all broadcasting stations do not necessarily operate emergency warnings, and when whether emergency warning information has been transported is monitored, it is necessary to monitor services provided by broadcasting stations operating emergency warnings (broadcast services).

However, because, in various current broadcasting schemes, there is no means on the receiver side to identify services provided by broadcasting stations operating emergency warnings, a service to be monitored cannot be specified expressly on the receiver side.

For this reason, proposals have been requested, in the case where a service provided by a broadcasting station operating emergency warnings is monitored on the receiver in standby mode, to expressly specify the service to be monitored.

As described above, there is a demand, at the time of introduction of an emergency warning system, to introduce an emergency warning system capable of providing an emergency warning service more suited to actual operation including expressly specifying a service to be monitored.

For this reason, the present technology proposes the following scheme to be able to provide an emergency warning service more suited to actual operation:

That is, in the present technology, emergency warning notice information (emergency warning flag) indicating whether emergency warning information has been transported is included as physical layer signalling, and monitoring information (emergency warning monitor descriptor which will be described later) for monitoring a specific service (service provided by a broadcasting station operating emergency warnings) is included as upper layer signalling.

This allows a service to be monitored to be expressly specified on the basis of monitoring information (emergency warning monitor descriptor), making it possible, as a result, to provide an emergency warning service more suited to actual operation.

It should be noted that, in the description given below, a T2 frame compliant with the DVB-T2 standard will be described as an example of a physical layer frame. Also, L1-post signalling and IN-BAND signalling prescribed in the DVB-T2 standard will be described as examples of physical layer signalling including the above emergency warning notice information (emergency warning flag) and so on described above.

Further, SDT (Service Description Table) prescribed in the DVB-T2 standard will be described as an example of upper layer signalling including the above emergency information (emergency warning monitor descriptor). It should be noted that there are SDT Actual TS and SDT Other TS for SDT and that monitoring information can be placed into SDT Actual TS.

3. Physical Layer Signalling (Structure of the T2 Frame)

Figure 4:
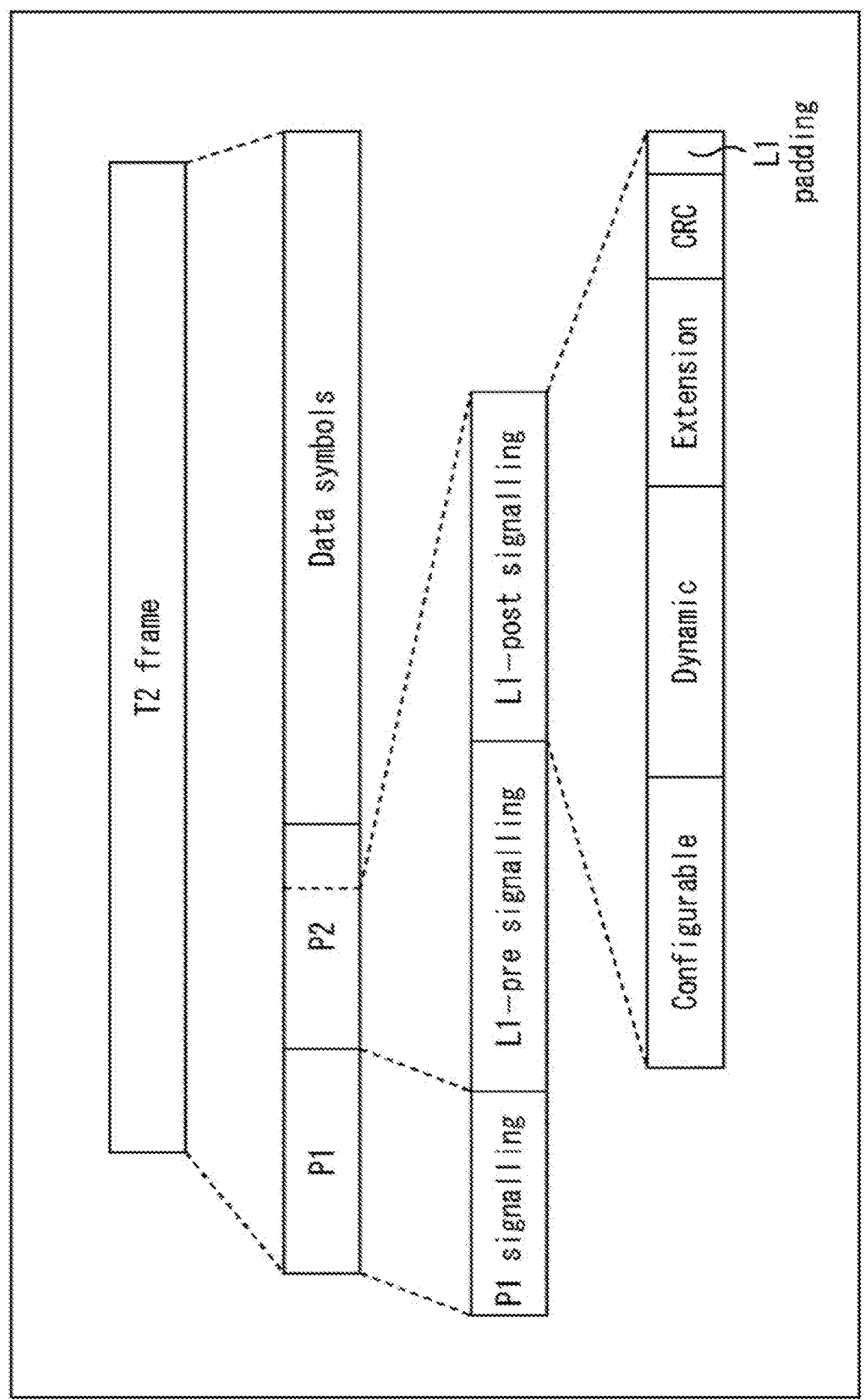
FIG. 4 is a diagram illustrating a structure of a T2 frame.

FIG. 4 is a diagram illustrating a structure of a T2 frame.

In the DVB-T2 standard, a frame called a T2 frame is defined, and data is sent in units of a T2 frame. A T2 frame includes two types of preamble signals called P1 and P2, and these preamble signals include information required for demodulation of OFDM (Orthogonal Frequency Division Multiplexing) signals and other processes.

A T2 frame includes a P1 symbol, a P2 symbol, and data symbols in this order.

A P1 symbol is a symbol for transmitting P1 signalling, and P1 signalling includes a transmission type and basic transmission parameters.

A P2 symbol is a symbol for transmitting L1-pre signalling and L1-post signalling. L1-pre signalling includes information for a receiver that receives a T2 frame to receive and decode L1-post signalling. L1-post signalling includes parameters required for the receiver to access the physical layer (e.g., PLP (Physical Layer Pipes)).

L1-post signalling includes two types of fields, Configurable and Dynamic L1-post signalling. Further, an optional Extension field for expansion purpose is available. Also, these fields are followed by a CRC (Cyclic Redundancy Check) and L1 padding in this order.

It should be noted that, in the DVB-T2 standard, it is possible to multiplex a frame called FEF (Future Extension Frame) having a structure different from a T2 frame in a time direction and transmit the multiplexed frame between T2 frames sent. Also, an auxiliary stream can be included in a T2 frame together with PLPs.

Also, there are two kinds of T2 frames, a T2-Base frame targeted for stationary receivers such as TV receivers and a T2-Lite frame targeted for mobile receivers such as smartphones and tablet computers. Although classified by profile, these T2 frame types have a common structure irrespective of the profile type.

(1) L1-Post Signalling (Syntax of Configurable L1-Post Signalling)

Figure 5:
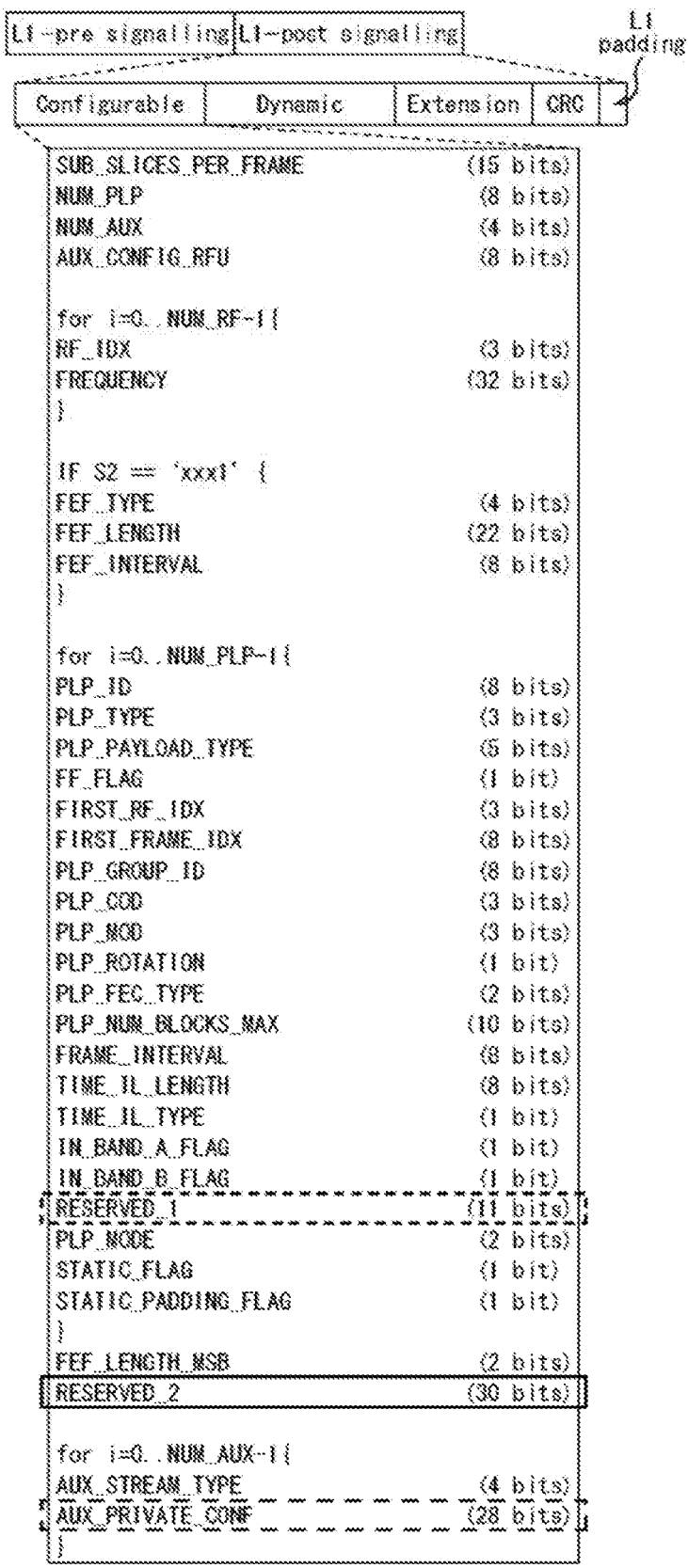
FIG. 5 is a diagram illustrating a syntax of Configurable L1-post signalling.

FIG. 5 is a diagram illustrating a syntax of Configurable L1-post signalling.

SUB_SLICES_PER_FRAME, NUM_PLP, NUM_AUX, and AUX_CONFIG_RFU fields are provided in Configurable L1-post signalling.

Thereafter, RF_IDX and FREQUENCY fields are provided in an RF loop corresponding to NUM_RF. Also, in the case where a relationship S2=='xxx1' is satisfied, FEF_TYPE, FEF_LENGTH, and FEF_INTERVAL fields are provided.

Further thereafter, PLP_ID, PLP_TYPE, PLP_PAYLOAD_TYPE, FF_FLAG, FIRST_RF_IDX, FIRST_FRAME_IDX, PLP_GROUP_ID, PLP_COD, PLP_MOD, PLP_ROTATION, PLP_FEC_TYPE, PLP_NUM_BLOCKS_MAX, FRAME_INTERVAL, TIME_IL_LENGTH, TIME_IL_TYPE, IN_BAND_A_FLAG, IN_BAND_B_FLAG, PLP_MODE, STATIC_FLAG, and STATIC_PADDING_FLAG fields are provided in a PLP loop corresponding to NUM_PLP.

Also, 11-bit RESERVED_1 is available in this PLP loop. Then, when the PLP loop is exited, an FEF_LENGTH_MSB field is provided followed by 30-bit RESERVED_2.

Thereafter, AUX_STREAM_TYPE and AUX_PRIVATE_CONF fields are provided in an AUX loop corresponding to NUM_AUX.

Here, AUX_STREAM_TYPE is a four-bit field that prescribes a type of an auxiliary stream. AUX_PRIVATE_CONF is a 28-bit field that prescribes details regarding an auxiliary stream.

It should be noted that, as indicated in "Table 36: Signalling format for the auxiliary stream type," NPL 1 above, in the case where bits '0000' are set as AUX_STREAM_TYPE, this indicates that the auxiliary stream is that of TX-SIG (Transmitter Signatures).

Also, the table indicates that, in AUX_STREAM_TYPE, bits other than '0000' are all reserved for future use. Here, the present technology assigns, for example, bits '1111' to "Emergency Signalling" as AUX_STREAM_TYPE, thereby making it possible to specify information regarding emergency warning in AUX_PRIVATE_CONF.

As described above, in Configurable L1-post signalling, arbitrary information can be assigned to 11-bit RESERVED_1, 30-bit RESERVED_2, and 28-bit AUX_PRIVATE_CONF. In the present technology, therefore, information regarding emergency warning is assigned to these RESERVED and AUX_PRIVATE_CONF.

It should be noted that details of each field provided in Configurable L1-post signalling are given in "7.2.3.1 Configurable L1-post signalling" in NPL 1 above. Therefore, a detailed description thereof is omitted here.

(Syntax of Dynamic L1-Post Signalling)

Figure 6:
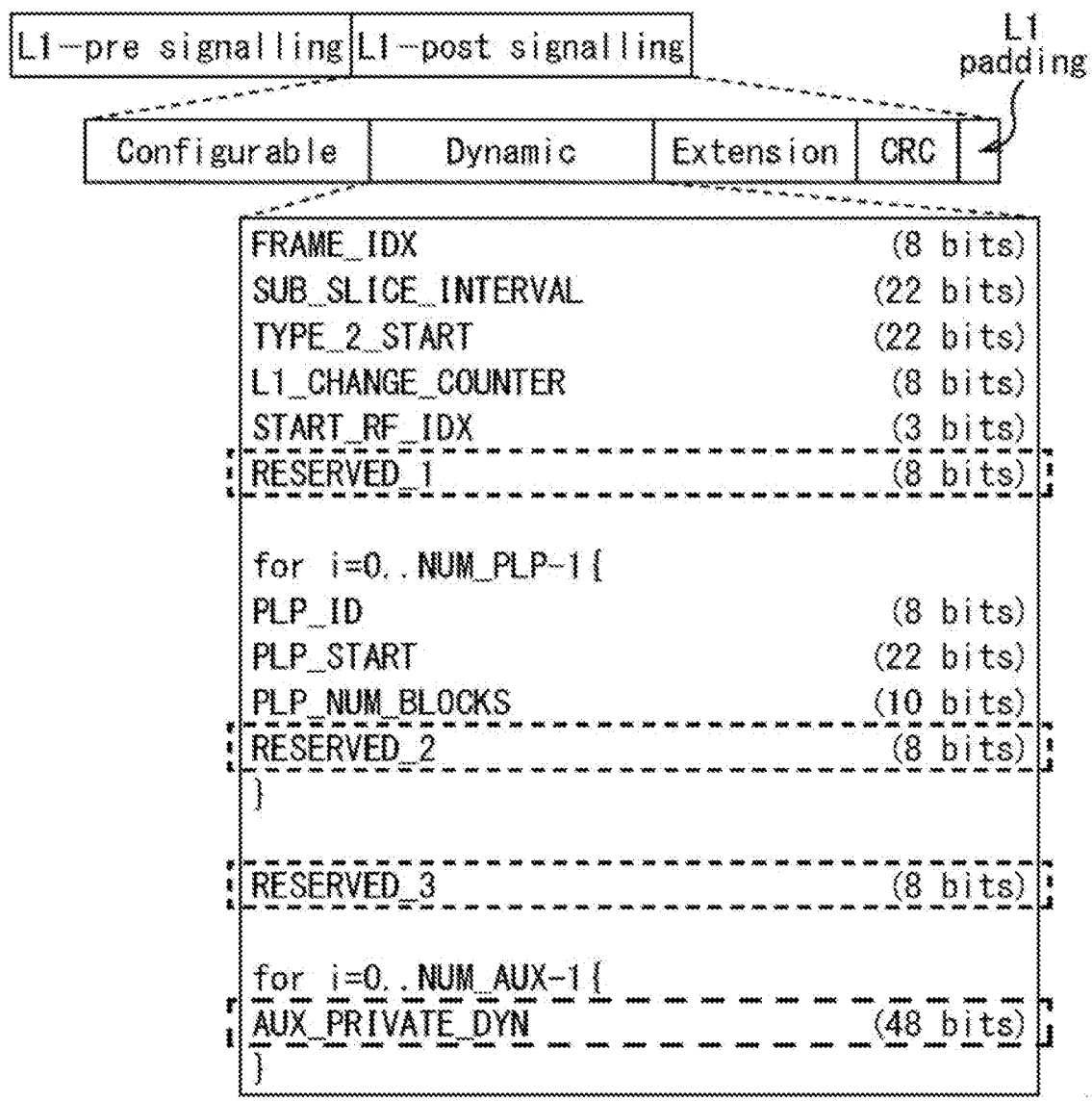
FIG. 6 is a diagram illustrating a syntax of Dynamic L1-post signalling.

FIG. 6 is a diagram illustrating a syntax of Dynamic L1-post signalling.

FRAME_IDX, SUB_SLICE_INTERVAL, TYPE_2_START, L1_CHANGE_COUNTER, and START RF_IDX fields are provided in Dynamic L1-post signalling.

Also, thereafter, eight-bit RESERVED_1 is available.

Thereafter, PLP_ID, PLP_START, and PLP_NUM_BLOCKS fields are provided in the PLP loop corresponding to NUM_PLP.

Also, eight-bit RESERVED_2 is available in the PLP loop. Then, when the PLP loop is exited, eight-bit RESERVED_3 is further available.

Thereafter, AUX_PRIVATE_DYN is provided in the AUX loop corresponding to NUM_AUX. Here, AUX_PRIVATE_DYN is a 48-bit field that prescribes details regarding an auxiliary stream.

It should be noted that this AUX_PRIVATE_DYN specifies information regarding an auxiliary stream whose type is specified in AUX_STREAM_TYPE of Configurable signalling illustrated in FIG. 5. That is, for example, in the case where bits '1111' indicating "Emergency Signalling" are specified as AUX_STREAM_TYPE, information regarding emergency warning can be specified in AUX_PRIVATE_DYN.

As described above, in Dynamic L1-post signalling, arbitrary information can be assigned to eight-bit RESERVED_1, eight-bit RESERVED_2, eight-bit RESERVED_3, and 48-bit AUX_PRIVATE_DYN. In the present technology, therefore, information regarding emergency warning is assigned to these RESERVED and AUX_PRIVATE_DYN.

It should be noted that details of each field provided in Dynamic L1-post signalling are given in "7.2.3.2 Dynamic L1-post signalling" in NPL 1 above. Therefore, a detailed description thereof is omitted here.

(2) IN-BAND Signalling (Padding Field Format)

FIG. 7 is a diagram illustrating a structure in the case where a padding field of a BB frame is used as IN-BAND signalling. It should be noted that a T2 frame is formed by a plurality of BB frames each having such a structure.

In FIG. 7, an 80-bit BB header (BBHEADER) is added to a data field (DATA FIELD) of a BB frame. Also, a padding (PADDING) field can be provided following the data field in a BB frame.

IN-BAND signalling fields can be provided in this padding field as illustrated in FIG. 7.

Here, there are three cases, a first case in which only a type A IN-BAND signaling field is provided, a second case in which only a type-B signalling field is provided, and a third case in which both type A and type B IN-BAND signalling fields are provided.

It should be noted that details of IN-BAND signalling are given in "5.2.3 Use of the padding field for in-band signalling" in NPL 1 above.

(Syntax of Type A IN-BAND Signalling)

FIG. 8 is a diagram illustrating a syntax of type A IN-BAND signalling.

PADDING_TYPE and PLP L1_CHANGE_COUNTER fields are provided in type A IN-BAND signalling. Also, thereafter, eight-bit RESERVED_1 is available.

Thereafter, SUB_SLICE_INTERVAL, START RF_IDX, and CURRENT_PLP_START fields are provided in a $P_I$ loop corresponding to $P_I$.

Also, eight-bit RESERVED_2 is available in the $P_I$ loop. Then, when the $P_I$ loop is exited, CURRENT_PLP_NUM_BLOCKS and NUM_OTHER_PLP_IN_BAND fields are provided.

Thereafter, PLP_ID, PLP_START, and PLP_NUM_BLOCKS fields are provided in an OTHER_PLP_IN_BAND loop corresponding to NUM_OTHER_PLP_IN_BAND.

Also, eight-bit RESERVED_3 is available in the OTHER_PLP_IN_BAND loop. Then, when the OTHER_PLP_IN_BAND loop is exited, a TYPE_2_START field is provided in the $P_I$ loop corresponding to $P_I$.

As described above, in type A IN-BAND signalling, arbitrary information can be assigned to eight-bit RESERVED_1, eight-bit RESERVED_2, and eight-bit RESERVED_3. In the present technology, therefore, information regarding emergency warning is assigned to these RESERVED.

It should be noted that details of each field provided in type A IN-BAND signalling are given in "5.2.3.1 In-band type A" in NPL 1 above. Therefore, a detailed description thereof is omitted here.

(Syntax of Type B in-Band Signalling)

FIG. 9 is a diagram illustrating a syntax of type B IN-BAND signalling.

PADDING_TYPE, TTO, FIRST_ISCR, BUFS_UNIT, BUFS, and TS_RATE fields are provided in type B IN-BAND signalling.

Also, thereafter, eight-bit RESERVED_B is available.

As described above, in type B IN-BAND signalling, arbitrary information can be assigned to eight-bit RESERVED_B. In the present technology, therefore, information regarding emergency warning is assigned to this eight-bit RESERVED_B.

It should be noted that details of each field provided in type B IN-BAND signalling are given in "5.2.3.2 In-band type B" in NPL 1 above. Therefore, a detailed description thereof is omitted here.

As described above, in the present technology, information regarding emergency warning can be assigned to L1 post-signalling RESERVED, AUX_PRIVATE_CONF, and AUX_PRIVATE_DYN bits or IN-BAND signalling RESERVED bits. A description will be given below of a specific example of bit assignment to information regarding emergency warning.

4. Specific Example of Bit Assignment (Example of Bit Assignment)
FIG. 10 is a diagram illustrating an example of bit assignment.
In the example of bit assignment illustrated in FIG. 10, a case is illustrated in which information regarding emergency warning is assigned to 30-bit RESERVED_2 and 28-bit AUX_PRIVATE_CONF in Configurable L1-post signalling.
That is, in the example of bit assignment illustrated in FIG. 10, the 30 bits of RESERVED_2 in Configurable L1-post signalling are assigned respectively to EMERGENCY_WARNING, EWS_VERSION, SERVICE_ID, and EWS_CODE.
One-bit EMERGENCY_WARNING is a flag indicating that emergency warning information is transported. Hereinafter, this flag will be also referred to as emergency warning notice information (emergency warning flag).
Five-bit EWS_VERSION indicates a version of emergency warning information. This version is incremented in the case where details of emergency warning information are changed.
16-bit SERVICE_ID indicates an identifier of a service to which the reception apparatus 30 in standby mode tunes after automatic startup.
Eight-bit EWS_CODE indicates a type code of emergency warning. A disaster type such as earthquake or typhoon is, for example, specified as this type code.
Also, in the example of bit assignment illustrated in FIG. 10, '1111' indicating "Emergency Signalling" is specified in AUX_STREAM_TYPE in Configurable L1-post signalling, and COUNTRY_CODE, REGION_CODE, and RESERVERD are assigned respectively to the 28 bits of AUX_PRIVATE_CONF as information regarding emergency warning.
The 16-bit COUNTRY_CODE indicates a country code. Two-byte ISO 3166-1 alpha-2 code prescribed by the International Organization for Standardization (ISO), for example, can be used as this country code.
The eight-bit REGION_CODE indicates a domestic region code. A code for classifying regions into which each country determined, for example, by a country code is further divided can be used as this region code.
The four-bit RESERVERD is a region for future expansion.
As described above, in the example of bit assignment illustrated in FIG. 10, EMERGENCY_WARNING is prescribed in RESERVED_2 in Configurable L1-post signalling. This makes it possible to automatically start up the reception apparatus 30 in standby mode in the case where emergency warning information is provided.
That is, for example, in the case where the reception apparatus 30 as a TV receiver is in standby mode, and when EMERGENCY_WARNING='0' is specified as emergency warning notice information being monitored, no emergency warning information has been provided. Therefore, the reception apparatus 30 remains in standby mode. On the other hand, when EMERGENCY_WARNING='1' is specified as emergency warning notice information being monitored, emergency warning information has been provided. Therefore, the reception apparatus 30 in standby mode starts up automatically.

At this time, the reception apparatus 30 that has started up automatically tunes to a broadcasting service (emergency warning service) corresponding to a service ID specified in SERVICE_ID prescribed in RESERVED_2 in Configurable L1-post signalling, allowing emergency warning information to be presented (notified) by the emergency warning service. It should be noted, however, that, for example, in the case where tuning information such as service ID is specified by an emergency warning monitor descriptor (FIG. 11 or 12) which will be described later, there is no need to provide SERVICE_ID field in this Configurable RESERVED_2.
Also, in the example of bit assignment illustrated in FIG. 10, EWS_VERSION is prescribed in RESERVED_2 in Configurable L1-post signalling. This makes it possible to manage the version of emergency warning information. As a result, for example, in the case where the reception apparatus 30 is put back into standby mode by the user after having been automatically started on purpose while in standby mode, and when the same EWS_VERSION is specified as at the time of automatic startup, it is possible to implement the reception apparatus 30, for example, in such a manner as to prevent the reception apparatus 30 from starting up automatically again.
Further, by setting, in advance, a type of emergency warning information (e.g., disaster type such as earthquake or typhoon) that will be provided on the reception apparatus 30, it is possible to perform a determination process to determine whether the type matches with the type of emergency warning specified in EWS_CODE of RESERVED_2 in Configurable L1-post signalling.
Then, in the case where the reception apparatus 30 in standby mode receives emergency warning notice information (EMERGENCY_WARNING='1'), and when there is a match in emergency warning type, the emergency warning information falls under the target type. As a result, the reception apparatus 30 starts up automatically. As described above, the reception apparatus 30 can present (notify) only emergency warning information regarding a specific disaster such as earthquake or typhoon to the user.
Also, in the example illustrated in FIG. 10, EMERGENCY_WARNING is prescribed in RESERVED_2 in Configurable L1-post signalling, and further, COUNTRY_CODE and REGION_CODE are prescribed in AUX_PRIVATE_CONF. This makes it possible to enable emergency warning notice information on the reception apparatus 30 only in a specific region of a specific country.
That is, by setting, in advance, a country code and a region code corresponding to the installation position of the reception apparatus 30 and so on on the reception apparatus 30, it is possible to perform a determination process to determine whether the codes match with the country code and the region code specified in COUNTRY_CODE and REGION_CODE of AUX_PRIVATE_CONF in Configurable L1-post signalling.
Then, in the case where the reception apparatus 30 in standby mode receives emergency warning notice information (EMERGENCY_WARNING='1'), and when there is a match in country code and region code, the reception apparatus 30 is located in the target region for emergency warning information. As a result, the reception apparatus 30 starts up automatically. On the other hand, even in the case where the reception apparatus 30 in standby mode receives emergency warning notice information (EMERGENCY_WARNING='1'), and when there is a mismatch in country code and region code, the reception apparatus 30 is not located in the target region for emergency warning information. Therefore, the reception apparatus 30 remains in standby mode.

As described above, even in the case where emergency warning information to be notified varies from one country to another or from one region to another, it is possible to provide emergency warning information to the reception apparatuses 30 on a country-by-country or region-by-region basis by using COUNTRY_CODE and REGION_CODE.

Then, in the case where the reception apparatus 30 in standby mode receives emergency warning notice information (EMERGENCY_WARNING='1'), and when there is a match not only in country code and region code but also in emergency warning type, the reception apparatus 30 is located in the target region for emergency warning information, and the emergency warning information falls under the target type. As a result, the reception apparatus 30 starts up automatically. As described above, the reception apparatus 30 can present (notify) only emergency warning information regarding a specific disaster such as earthquake or typhoon on a country-by-country or region-by-region basis.

It should be noted that, as information regarding emergency warning, not only characteristic information indicating characteristics of emergency warning information such as version of emergency warning information, target country and region, and disaster type indicated by details of the emergency warning information but also, for example, information (additional information notice information) indicating whether additional information such as text data, audio data, application startup information, and tuning information after automatic startup is transported may be included.

It should be noted that the example of bit assignment described above is merely an example, and that information regarding emergency warning can be assigned to target bits by using RESERVED, AUX_PRIVATE_CONF, and AUX_PRIVATE_DYN in L1-post signalling alone or in combination.

Also, although a case was illustrated in the example of bit assignment described above in which information regarding emergency warning was assigned to the bits of RESERVED and AUX_PRIVATE_CONF in L1-post signalling, information regarding emergency warning (e.g., EMERGENCY_WARNING, EWS_CODE, COUNTRY_CODE, REGION_CODE) can be similarly assigned to the bits of RESERVED in IN-BAND signalling.

Further, it is possible to not only assign information regarding emergency warning to the bits in L1-post signalling and IN-BAND signalling but also to assign, for example, part of information regarding emergency warning to the bits of RESERVED, AUX_PRIVATE_CONF, and AUX_PRIVATE_DYN in L1-post signalling and remaining information to the bits of RESERVED in IN-BAND signalling.

5. Upper Layer Signalling

In the DVB-T2 standard, PAT (Program Association Table), PMT (Program Map Table), NIT (Network Information Table), and so on are prescribed as upper layer signalling. Monitoring information (emergency warning monitor descriptor) for monitoring specific services (services provided by a broadcasting station operating emergency warning information) can be included, for example, in an SDT (Service Description Table).

It should be noted, however, that an emergency warning monitor descriptor may be included in a table other than SDT.

(Syntax of the Emergency Warning Monitor Descriptor)

FIG. 11 is a diagram illustrating an example of a syntax of an emergency warning monitor descriptor (EA_monitor_descriptor).

Eight-bit descriptor_tag indicates a tag value of an emergency warning monitor descriptor.

Eight-bit descriptor_length indicates a length of an emergency warning monitor descriptor.

Eight-bit version indicates a version of an emergency warning monitor descriptor.

Eight-bit num_EA_service indicates the number of emergency warning services. In an EA_service loop corresponding to the number of emergency warning services indicated by this num_EA_service, frequency, transport_stream_id, plp_id, and service_id fields are provided.

32-bit frequency indicates a frequency for monitoring emergency warning information (unit: MHz). This frequency can be expressed in four-bit BCD (Binary Coded Decimal).

That is, this frequency is a frequency assigned to a broadcasting station (service thereof) for operating emergency warning. Therefore, the reception apparatus 30 can monitor emergency warning information by tuning to the service corresponding to the frequency band (emergency warning service). That is, the service corresponding to the frequency band (emergency warning service) is a service to be monitored.

It should be noted that although a case was described in this example in which a frequency (frequency band) assigned to a broadcasting station (service thereof) operating emergency warning was used, other information such as identification information for identifying a broadcasting network (network id) may be used as long as that information allows for identification of a broadcasting station (service thereof).

16-bit transport_stream_id indicates a transport stream Id, an identifier of a transport stream (TS) to which the reception apparatus 30 in standby mode tunes to after automatic startup.

Eight-bit plp_id indicates a PLP_ID, an identifier of a PLP (Physical Layer Pipe) to which the reception apparatus 30 in standby mode tunes to after automatic startup.

16-bit service_id indicates a service ID, an identifier of a service to which the reception apparatus 30 in standby mode tunes to after automatic startup.

That is, in the reception apparatus 30, it is possible to select a service after automatic startup by using a triplet, a combination of these transport stream ID, PLP_ID, and service ID, as tuning information. It should be noted that other information such as original network ID (original_network_id) may be, for example, included as tuning information.

One-bit expire_flag is a flag indicating that an emergency warning monitor descriptor has an expiration date. In the case where expire_flag='1' is specified as this flag, an expire_date_UTC field is provided as expiration date information.

64-bit expire_date_UTC indicates an expiration date of an emergency warning monitor descriptor. This expiration date can be specified, for example, in UTC (Coordinated Universal Time) format.

For example, in the case where the reception apparatus 30 receives an emergency warning monitor descriptor, information of the emergency warning monitor descriptor is recorded in the storage section 303. In the case where the expiration date of the recorded (acquired) emergency warning monitor descriptor is overdue, it is possible to acquire a new emergency warning monitor descriptor and update information of the emergency warning monitor descriptor recorded in the storage section 303.

Here, even assuming that the reception apparatus 30 is in standby mode, where the expiration date of the recorded (acquired) emergency warning monitor descriptor is overdue, the reception apparatus 30 may start up automatically, acquire a new emergency warning monitor descriptor, and update information of the emergency warning monitor descriptor.

It should be noted that, in FIG. 11, seven-bit reserved is a region for future expansion.

The syntax of an emergency warning monitor descriptor illustrated in FIG. 11 is merely an example, and other configuration can be used. For example, an application startup information field may be provided in an emergency warning monitor descriptor as illustrated in FIG. 12.

In FIG. 12, 16-bit url_length indicates a length of url information. A url_char field is provided to correspond to the url information length indicated by this url_length.

Eight-bit url_char indicates url information selected by the reception apparatus 30 in standby mode after automatic startup. This url information is a URL (Uniform Resource Locator) of an application that can be started up by the reception apparatus 30.

More specifically, for example, in the case where the reception apparatus 30 that supports HbbTV (Hybrid Broadcast Broadband TV) whose service has launched in Europe as a broadcast/communication-linked service acquires a URL (Uniform Resource Locator) of an HbbTV application as url information included in an emergency warning monitor descriptor, the HbbTV application is acquired via a communication line such as the Internet and started. Here, for example, emergency warning information and detailed information thereof is presented by this HbbTV application.

In FIG. 12, it should be noted that the fields related to url information other than url_length and url_char are the same as in FIG. 11. Therefore, a description thereof is omitted.

6. Flow of the Emergency Warning Information Response Processes

Figure 14:
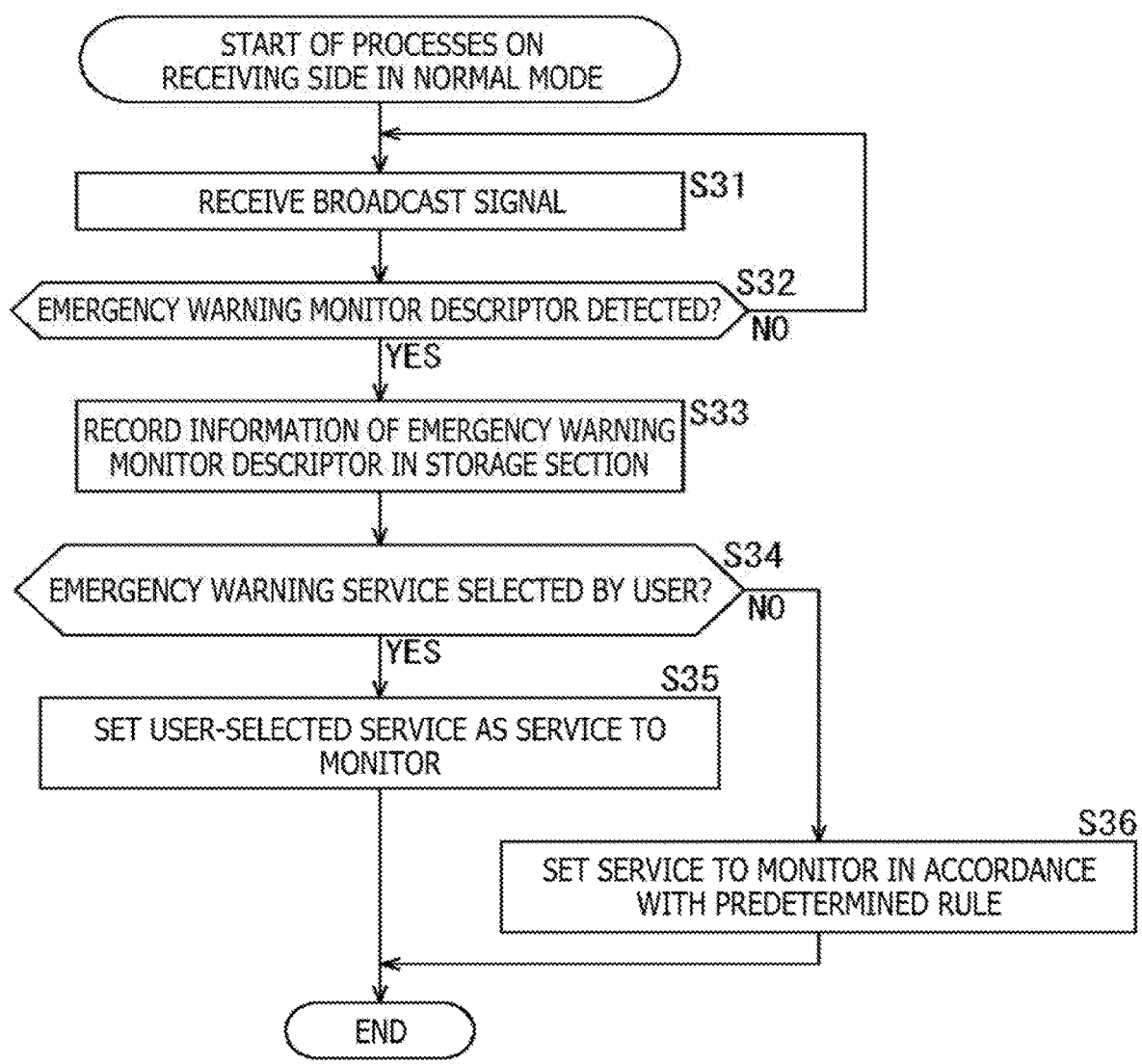
FIG. 14 is a flowchart describing a flow of processes on a receiving side in normal mode.
Figure 15:
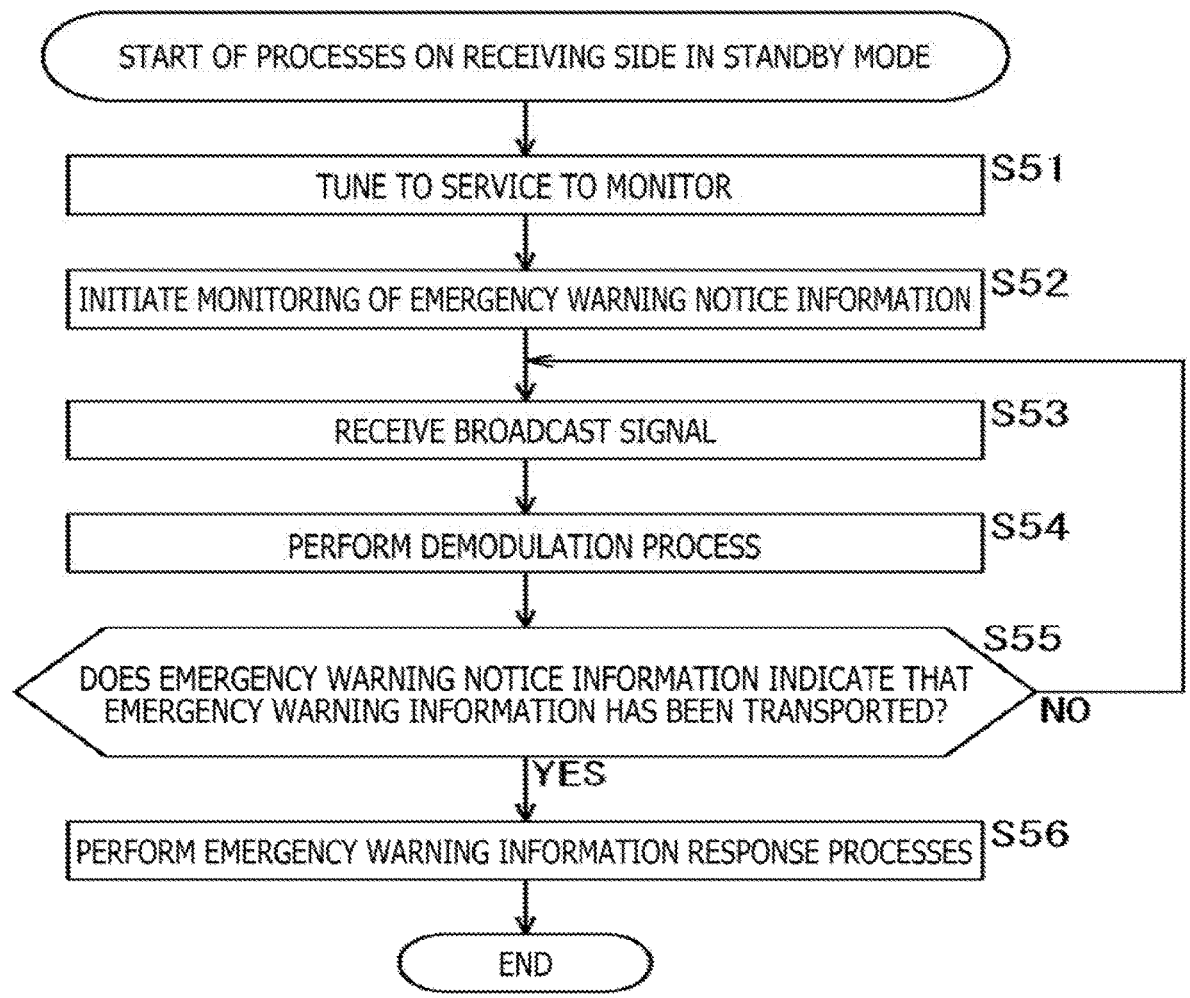
FIG. 15 is a flowchart describing a flow of processes on the receiving side in standby mode.

A description will be given next of flows of processes on the transmitting side and the receiving side with reference to the flowcharts illustrated in FIGS. 13 to 15.
(Processes on the Transmitting Side)
A description will be given first of a flow of processes on the transmitting side with reference to the flowchart illustrated in FIG. 13.

In step S11, the signalling generation section 112 of the data processing apparatus 10 generates upper layer signalling.

Here, a PAT, a PMT, an SDT, or other table is generated as upper layer signalling. In an SDT, for example, an emergency warning monitor descriptor is included as monitoring information. This emergency warning monitor descriptor can include not only monitoring target information indicating the frequency band assigned to the broadcasting station (service thereof) operating emergency warning but also tuning information such as triplet, application startup information, expiration date information, and so on.

In step S12, whether emergency warning information has been provided is determined. This determination process determines, for example, whether emergency warning information has been provided from a server managed by Japan Meteorological Agency or other governmental organization following a natural disaster such as earthquake or tsunami.

In the case where it is determined in step S12 that emergency warning information has been provided, the process proceeds to step S13. In step S13, emergency warning information response processes are performed by the data processing apparatuses 10 and the transmission apparatus 20.

In the emergency warning information response processes, not only emergency warning notice information (emergency warning flag) indicating the transport of emergency warning information but also characteristic information indicating characteristics of emergency warning information according to details of the emergency warning information are placed into physical layer signalling (L1-post signalling or IN-BAND signalling).

Here, for example, a version of emergency warning information, a target country and a target region, disaster type indicated by details of the emergency warning information are included as characteristic information.

It should be noted that in the case where it is determined in step S12 that emergency warning information has not been provided, the process in step S13 is skipped, and the process proceeds to step S14.

In step S14, the data processing section 211 of the transmission apparatus 20 generates a T2 frame as a physical layer frame.

Here, the T2 frame includes physical layer signalling, and further, the data portion thereof includes upper layer signalling. Then, in the case where the emergency warning information response processes (S13) are performed, L1-post signalling or IN-BAND signalling including emergency warning notice information, characteristic information, and so on is placed into the T2 frame as physical layer signalling.

In step S15, the modulation section 212 of the transmission apparatus 20 performs a necessary process such as modulation process on the physical layer frame (T2 frame) acquired by the process in step S14 and transmits a broadcast signal acquired as a result thereof from the transmitting antenna installed at the transmitting station.

Figure 13:
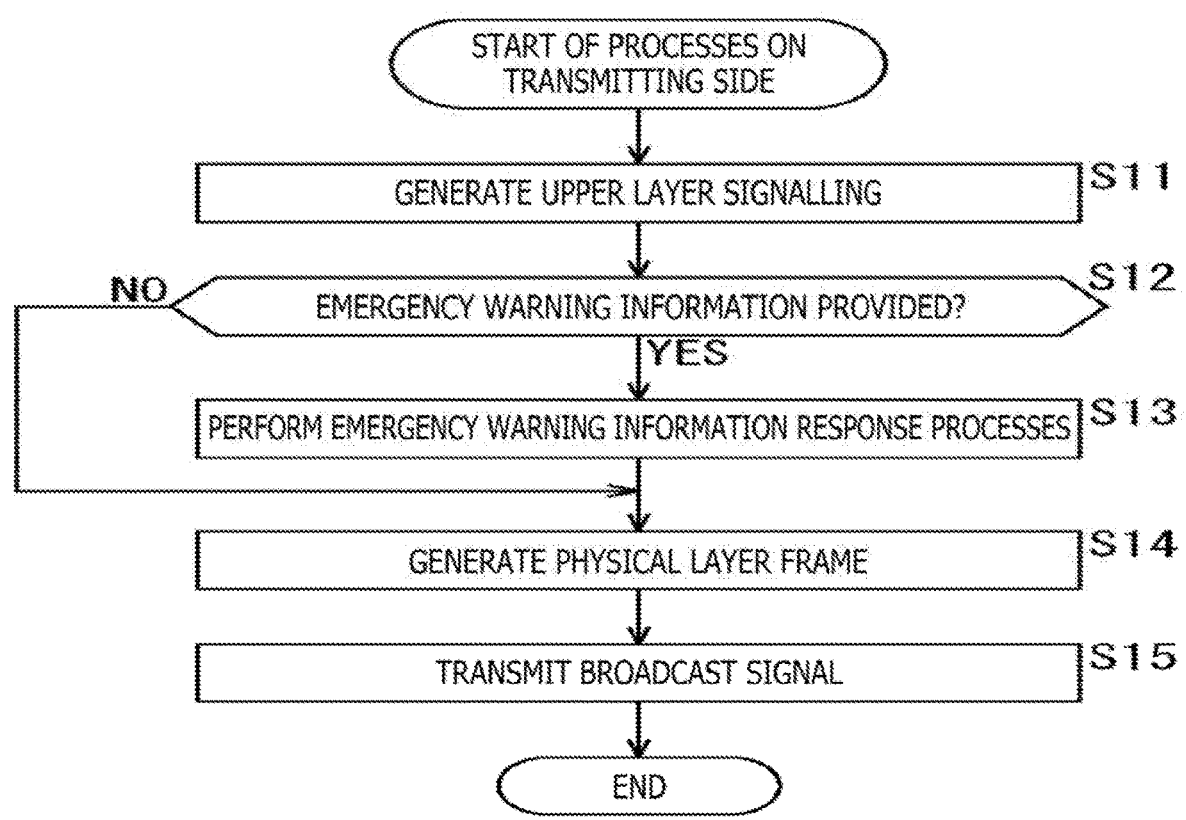
FIG. 13 is a flowchart describing a flow of processes on a transmitting side.

It should be noted that the processes from step S11 to step S15 illustrated in FIG. 13 are repeated. That is, summarizing the processes on the transmitting side, upper layer signalling including an emergency warning monitor descriptor is normally transmitted. In the event of an emergency, however, the emergency warning information response processes (S13) are performed, causing physical layer signalling including information such as emergency warning notice information (emergency warning flag) and characteristic information to be transmitted.

The flow of processes on the transmitting side has been described above.
(Processes on the Receiving Side in Normal Mode)
A description will be given next of a flow of processes on the receiving side in normal mode with reference to the flowchart illustrated in FIG. 14.

In step S31, the tuner 311 receives the broadcast signal transmitted from the transmission apparatus 20 via the antenna 321 and performs a necessary process on the broadcast signal. Here, the demodulation section 312 performs a demodulation process on the signal acquired as a result thereof, and the data processing section 313 performs a given process on the data (packet) acquired as a result of the demodulation process, allowing upper layer signalling to be acquired.

In step S32, the data processing section 313 determines whether an emergency warning monitor descriptor has been detected as upper layer signalling.

It should be noted that, here, it is possible, for example, to ignore the emergency warning monitor descriptor that has been already acquired and detect only a new emergency warning monitor descriptor by confirming the version (eight-bit version) of the emergency warning monitor descriptor.

In the case where it is determined in step S32 that an emergency warning monitor descriptor has not been detected, the process returns to step S31, and the subsequent processes are repeated. On the other hand, in the case where it is determined in step S32 that an emergency warning monitor descriptor has been detected, the process proceeds to step S33.

In step S33, the processing section 301 records information acquired from the emergency warning monitor descriptor in the storage section 303.

Here, not only monitoring target information indicating the frequency band assigned to the broadcasting station (service thereof) operating emergency warning but also tuning information such as triplet, application startup information, expiration date information, and so on are recorded in the storage section 303. Also, the number of broadcasting stations (services thereof) operating emergency warning is not limited to one, and there is a case where two or more broadcasting stations exist.

In step S34, the processing section 301 determines whether an emergency warning service has been selected by the user.

That is, it is possible to specify frequency bands for one or a plurality of services in an emergency warning monitor descriptor as monitoring target information, and in the case where there are a plurality of services (emergency warning services), a list of selectable services is presented so that the user can select a desired service from among the plurality of services.

In the case where it is determined in step S34 that a service has been selected, the process proceeds to step S35. In step S35, the processing section 301 sets the user-selected service as a service to be monitored.

On the other hand, in the case where it is determined in step S34 that no service has been selected, the process proceeds to step S36. In step S36, the processing section 301 sets a service to be monitored in accordance with a predetermined rule.

Here, for example, it is possible to set, of the plurality of services specified in the emergency warning monitor descriptor by monitoring target information, the service having the smallest service ID as a service to be monitored. It should be noted that the smallest service ID is merely an example of predetermined rule, and other rule may also be adopted such as setting the service having the largest service ID.

When information regarding a service is recorded in the storage section 303 after the service has been set as a service to be monitored by the process in step S35 or S36, the processes on the receiving side in normal mode are terminated.

The flow of processes on the receiving side in normal mode has been described above.

It should be noted that although focus was placed on the processes in the case where an emergency warning monitor descriptor included in upper layer signalling was detected for reasons of simple description in the description of the processes on the receiving side in normal mode, the reception apparatus 30 performs, for example, other process such as content reproduction corresponding to user's tuning operation.

(Processes on the Receiving Side in Standby Mode)

A description will be given next of a flow of processes on the receiving side in standby mode with reference to the flowchart illustrated in FIG. 15.

It should be noted that these processes on the receiving side in standby mode are performed after a service to be monitored has been set following the performance of the processes on the receiving side in normal mode (FIG. 14) described earlier.

Also, when in low-power-consuming standby mode, the reception apparatus 30 can select whether to monitor emergency warning notice information. Therefore, in the case where the non-monitoring of emergency warning notice information is, for example, selected by user operation in the reception apparatus 30, these processes on the receiving side in standby mode are not performed.

In step S51, the tuner 311 tunes to the service to be monitored set in advance in normal mode before switching from normal mode to standby mode. Here, information regarding the service was recorded in the storage section 303 when the service to be monitored was selected in normal mode. Therefore, the tuner 311 performs tuning operation based on this information.

In step S52, the demodulation section 312 performs a demodulation process on the signal output from the tuner 311 and initiates the monitoring of emergency warning notice information (emergency warning flag) included in physical layer signalling acquired from the physical frame (T2 frame).

As a result, the monitoring of emergency warning notice information is initiated in the reception apparatus 30, and a received broadcast signal is processed by the tuner 311 and demodulated by the demodulation section 312 (S53 and S54).

Then, it is determined in step S55 whether emergency warning notice information included in L1-post signalling or IN-BAND signalling transported as physical layer signalling acquired from the broadcast signal of the service to be monitored indicates the transport of emergency warning information in accordance with the result of the demodulation process in step S54.

In the case where it is determined in step S55 that emergency warning notice information does not indicate that emergency warning information has been transported (EMERGENCY WARNING='0'), the process returns to step S53, and the processes from step S53 to step S55 are repeated.

That is, in this case, no emergency warning service is provided. Therefore, in the case where the reception apparatus 30 is, for example, in standby mode, the demodulation section 312 continues to monitor emergency warning notice information included in L1-post signalling or IN-BAND signalling for the service to be monitored.

On the other hand, in the case where it is determined in step S55 that emergency warning notice information indicates that emergency warning information has been transported (EMERGENCY WARNING='1'), the process proceeds to step S56. In step S56, the reception apparatus 30 performs the emergency warning information response processes.

In these emergency warning information response processes, for example, the reception apparatus 30 in standby mode starts up automatically, receives an emergency warning service, and presents (notifies) emergency warning information to the user.

Here, for example, in the case where characteristic information indicating characteristics of emergency warning information is included in L1-post signalling or other information, the reception apparatus 30 starts up automatically only in the case where the characteristic information matches with characteristics of the reception apparatus set in advance.

For example, the reception apparatus 30 starts up automatically in the case where the target country and the region of the emergency warning information match with the country and the region set in advance and in the case where the disaster type thereof (e.g., natural disaster such as earthquake or tsunami) matches with the disaster type set in advance.

Also, in the case where the reception apparatus 30 switches from standby mode over to normal mode after automatic startup, it is possible to cause the reception apparatus 30 to tune to a service corresponding to tuning information (e.g., triplet acquired from the emergency warning monitor descriptor) recorded in the storage section 303 and present (notify) emergency warning information provided by the service.

Also, in the case where the reception apparatus 30 switches from standby mode over to normal mode after automatic startup, it is possible to acquire an HbbTV application from an HbbTV server via a communication line such as the Internet on the basis of url information (e.g., HbbTV application URL acquired from the emergency warning monitor descriptor) recorded in the storage section 303 and start the application. Here, for example, it is possible to cause emergency warning information and detailed information thereof to be presented (notified) by using this HbbTV application.

The flow of processes on the receiving side in standby mode has been described above.

As described above, as for the processes to be performed by the reception apparatus 30 on the receiving side, by setting, in normal mode, a service to be monitored on the basis of monitoring information (emergency warning monitor descriptor) included in upper layer signalling, the reception apparatus 30 tunes to the service to be monitored in standby mode of monitoring of emergency warning notice information (emergency warning flag) included in physical layer signalling.

That is, in the reception apparatus 30, a service to be monitored can be expressly set on the basis of monitoring information (emergency warning monitor descriptor). As a result, it is possible to provide an emergency warning service more suited to actual operation.

Also, for example, in the case where there are a plurality of services (programs) for a single broadcast signal, and when the reception apparatus 30 starts up automatically in response to emergency warning notice information (emergency warning flag), the reception apparatus 30 may not be able to identify which service to tune to. However, by placing tuning information in an emergency warning monitor descriptor, it is possible for the reception apparatus 30 to identify which service to tune to after automatic startup. Similarly, by placing application startup information in an emergency warning monitor descriptor, it is possible for the reception apparatus 30 to identify which application to acquire and start after automatic startup.

Further, while in standby mode, the reception apparatus 30 monitors emergency warning notice information (emergency warning flag). However, the emergency warning notice information is transported as physical layer signalling. Therefore, it is possible to monitor emergency warning notice information as long as the tuner 311 and the demodulation section 312 are active. In other words, the reception apparatus 30 can monitor emergency warning notice information without activating the system-on-chip (SoC) provided at the subsequent stage of the tuner 312 and the demodulation section 312.

As described above, the reception apparatus 30 can monitor emergency warning notice information without activating the system-on-chip (SoC), thus keeping down power consumption in standby mode. In particular, the system-on-chip (SoC) is highly power consuming. As a result, it is possible for the reception apparatus 30 to achieve more power consumption in standby mode.

It should be noted that, in an emergency warning system (EWS) in which, while in standby mode, the reception apparatus 30 monitors emergency warning notice information (emergency warning flag) included in a broadcast signal to perform automatic startup, presentation of emergency warning information, and so on, it is necessary to determine which broadcast signal to monitor and perform initial setup (preset) on the side of the reception apparatus 30. However, considering actual operation, it is not realistic to determine in advance which broadcasting stations will operate emergency warning.

For this reason, in the present technology, information regarding a broadcasting station operating emergency warning is transported as upper layer signalling (emergency warning monitor descriptor), thereby allowing for a service to be monitored (broadcasting station) to be expressly set. Also, in the present technology, operation after automatic startup (e.g., program tuning and application start) that can be specified is included as upper layer signalling (emergency warning monitor descriptor), thereby allowing for a program operating emergency warning to be displayed automatically or an application corresponding to emergency warning to be started up automatically. As a result, it is possible to provide an emergency warning service more suited to actual operation.

7. Modification Example (Application to Other Broadcasting Scheme)

Although, in the description given above, focus has been placed on DVB (Digital Video Broadcasting), the scheme adopted in European nations and so on as a digital television broadcasting standard, the present technology may be applied to ISDB (Integrated Services Digital Broadcasting) adopted in Japan and so on or ATSC (Advanced Television Systems Committee) adopted in US and so on.

That is, although emergency warning systems for conveying warning in the event of emergency such as natural disaster are available both in the ISDB standard and the ATSC standard, the application of the present technology allows for provision of an emergency warning service more suited to actual operation.

Also, the present technology is applicable, as a digital television broadcasting standard, not only to terrestrial broadcasting but also to satellite broadcasting using a broadcasting satellite (BS) or communications satellite (CS) and wired broadcasting using cable television (CATV).

(Other Example of Packet and Signalling)

Also, the packet, frame, signalling (field thereof), and other names described above are merely examples, and there are cases in which other names may be used. It should be noted, however, that these differences in name are differences in formality and that there is no difference in substantial content of target packet, frame, signalling (field thereof), and so on.

Also, although, in the description given above, emergency warning notice information (emergency warning flag) was included in physical layer signalling such as L1-post signalling, emergency warning notice information (emergency warning flag) is not limited to physical layer signalling, and for example, emergency warning notice information (emergency warning flag) may be transported as signalling or data of a layer higher than the physical layer (upper layer signalling).

8. Configuration of the Computer

Figure 16:
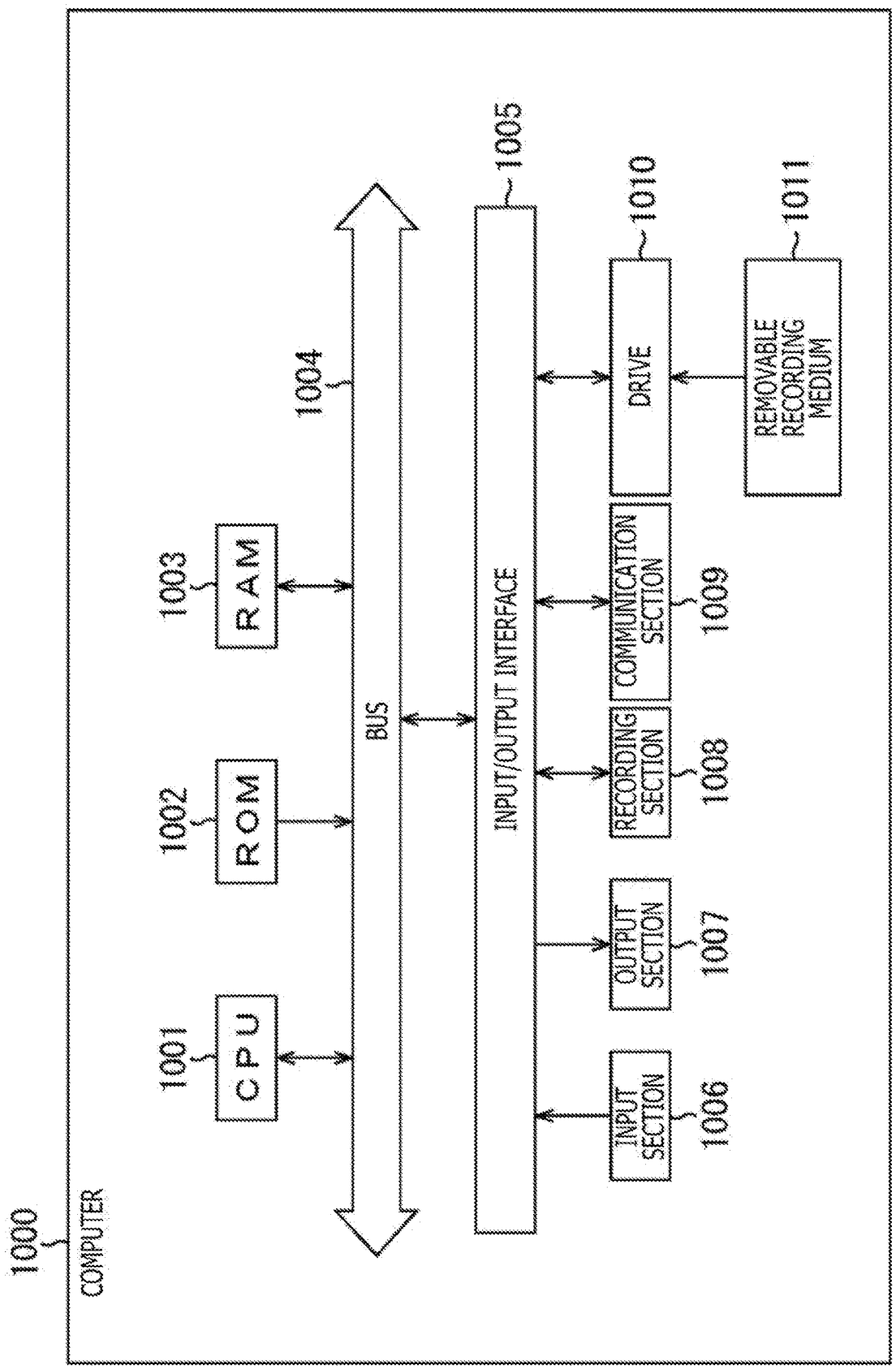
FIG. 16 is a diagram illustrating a configuration example of a computer.

The series of processes described above may be performed by hardware or software. In the case where the series of processes are performed by software, the program included in the software is installed to a computer. FIG. 16 is a diagram illustrating a hardware configuration example of a computer for performing the above series of processes using the program.

In a computer 1000, a CPU (Central Processing Unit) 1001, a ROM (Read Only Memory) 1002, and a RAM (Random Access Memory) 1003 are connected to each other by a bus 1004. An input/output interface 1005 is further connected to the bus 1004. An input section 1006, an output section 1007, a recording section 1008, a communication section 1009, and a drive 1010 are connected to the input/output interface 1005.

The input section 1006 includes a keyboard, a mouse, a microphone, and so on. The output section 1007 includes a display, a speaker, and so on. The recording section 1008 includes a hard disk, a non-volatile memory, and so on. The communication section 1009 includes a network interface and so on. The drive 1010 drives a removable recording medium 1011 such as magnetic disk, optical disc, magneto-optical disk, or semiconductor memory.

In the computer 1000 thus configured, the CPU 1001 loads, for example, the program recorded in the ROM 1002 or the recording section 1008 into the RAM 1003 via the input/output interface 1005 and the bus 1004 for execution, thereby allowing the above series of processes to be performed.

The program executed by the computer 1000 (CPU 1001) can be provided recorded, for example, in the removable recording medium 1011 as a packaged medium or the like. Alternatively, the program can be provided via a wired or wireless transport medium such as local area network, the Internet, and digital satellite broadcasting.

In the computer 1000, the program can be installed to the recording section 1008 via the input/output interface 1005 by inserting the removable medium 1011 into the drive 1010. Alternatively, the program can be received by the communication section 1009 via a wired or wireless transport medium and installed to the recording section 1008. In addition to the above, the program can be installed, in advance, to the ROM 1002 or the recording section 1008.

Here, in the present specification, the processes performed by the computer in accordance with the program need not necessarily be performed chronologically in accordance with the sequence described as a flowchart. That is, the processes performed by the computer in accordance with the program include those that are performed in parallel or individually (e.g., parallel processes or object-based processes). Also, the program may be processed by a single computer (processor) or by a plurality of computers in a distributed manner.

It should be noted that embodiments of the present technology are not limited to that described above and can be modified in various ways without departing from the gist of the present technology.

Also, the present technology can have the following configurations:

(1)
A reception apparatus including:
a reception section adapted to receive a physical layer frame transported as a broadcast signal on a basis of monitoring information that is included in upper layer signalling, signalling in a layer higher than a physical layer, and that is used to monitor a specific service; and
a demodulation section adapted to demodulate physical layer signalling acquired from the physical layer frame and monitor whether emergency warning information has been transported on a basis of emergency warning notice information acquired as a result of the demodulation,
the reception apparatus starting up automatically in a case where the emergency warning notice information indicates that the emergency warning information has been transported.

(2)
The reception apparatus of feature (1), in which
the monitoring information includes monitoring target information indicating identification information for identifying a frequency band assigned to each service or a broadcasting network as information for specifying a service to be monitored.

(3)
The reception apparatus of feature (1) or (2), in which
the monitoring information further includes tuning information,
the reception apparatus tuning to a service corresponding to the tuning information after automatic startup.

(4)
The reception apparatus of feature (1) or (2), in which
the monitoring information further includes application startup information,
the reception apparatus acquiring an application corresponding to the startup information and starting the application after automatic startup.

(5)
The reception apparatus of any one of features (1) to (4), in which
the monitoring information further includes expiration date information indicating an expiration date of the monitoring information,
the reception apparatus updating the acquired monitoring information on a basis of the expiration date information.

(6)
The reception apparatus of any one of features (1) to (5), in which
the monitoring information includes one or a plurality of services as services to be monitored,
the reception apparatus selecting a service to be monitored from among the one or the plurality of services in accordance with user selection or a predetermined rule.

(7)
The reception apparatus of any one of features (1) to (6) further including:
a storage section adapted to store the monitoring information acquired from the broadcast signal in a first mode of conducting normal reception, in which
the reception section tunes to a service to be monitored on a basis of the monitoring information stored in the storage section before switching over to a second mode of remaining on standby with low power consumption.

(8)

The reception apparatus of any one of features (1) to (7) starting up automatically in the case where characteristic information indicating characteristics of the emergency warning information acquired as a result of the demodulation of the physical layer signalling matches with characteristics of the reception apparatus.

(9)

The reception apparatus of any one of features (1) to (8), in which the physical layer frame complies with a DVB-T2 (Digital Video Broadcasting-Terrestrial 2) standard, and in which the physical layer signalling is L1-post signalling or IN-BAND signalling.

(10)

A reception method of a reception apparatus, the reception method including:

a step in which the reception apparatus receives a physical layer frame transported as a broadcast signal on a basis of monitoring information that is included in upper layer signalling, signalling in a layer higher than a physical layer, and that is used to monitor a specific service; and a step in which physical layer signalling acquired from the physical layer frame is demodulated, and whether emergency warning information has been transported is monitored on a basis of emergency warning notice information acquired as a result of the demodulation, the reception apparatus starting up automatically in a case where the emergency warning notice information indicates that the emergency warning information has been transported.

(11)

A transmission apparatus including:

a generation section adapted to generate a physical layer frame including physical layer signalling and including, in a data portion thereof, upper layer signalling, signalling in a layer higher than the physical layer; and a transmission section adapted to transmit the physical layer frame as a broadcast signal, in which the physical layer signalling includes emergency warning notice information corresponding to whether emergency warning information has been transported, and in which the upper layer signalling includes monitoring information for monitoring a specific service.

(12)

The transmission apparatus of feature (11), in which the monitoring information includes monitoring target information indicating identification information for identifying a frequency band assigned to each service or a broadcasting network as information for specifying a service to be monitored.

(13)

The transmission apparatus of feature (11) or (12), in which the monitoring information further includes tuning information.

(14)

The transmission apparatus of feature (11) or (12), in which the monitoring information further includes application startup information.

(15)

The transmission apparatus of any one of features (11) to (14), in which the monitoring information further includes expiration date information indicating an expiration date of the monitoring information.

(16)

The transmission apparatus of any one of features (11) to (15), in which the monitoring information includes one or a plurality of services as services to be monitored.

(17)

The transmission apparatus of any one of features (11) to (16), in which the physical layer signalling further includes characteristic information indicating characteristics of the emergency warning information.

(18)

The transmission apparatus of any one of features (11) to (17), in which the physical layer frame complies with a DVB-T2 standard, and in which the physical layer signalling is L1-post signalling or IN-BAND signalling.

(19)

A transmission method of a transmission apparatus, the transmission method including:

a step in which the transmission apparatus generates a physical layer frame including physical layer signalling that includes emergency warning notice information corresponding to whether emergency warning information has been transported and including, in a data portion thereof, upper layer signalling that includes monitoring information for monitoring a specific service as signalling in a layer higher than the physical layer; and a step in which the transmission apparatus transmits the physical layer frame as a broadcast signal.

REFERENCE SIGNS LIST

1 . . . Transport system, 10, 10-1 to 10-N . . . Data processing apparatuses, 20 . . . Transmission apparatus, 30, 30-1 to 30-M . . . Reception apparatuses, 40, 40-1 to 40-N . . . Communication lines, 50 . . . Broadcast transport channel, 111 . . . Component processing section, 112 . . . Signalling generation section, 113 . . . Multiplexer, 114 . . . Data processing section, 211 . . . Data processing section, 212 . . . Modulation section, 301 . . . Processing section, 302 . . . Input section, 303 . . . Storage section, 311 . . . Tuner, 312 . . . Demodulation section, 313 . . . Data processing section, 1000 . . . Computer, 1001 . . . CPU

The invention claimed is:

1. A reception apparatus comprising:
circuitry configured to
receive a physical layer frame transported as a broadcast signal on a basis of monitoring information that is included, at least partially, in reserved bits of a message in upper layer signalling, signalling in a layer higher than a physical layer, and that is used to monitor a specific service; and
demodulate physical layer signalling acquired from the physical layer frame and monitor whether emergency warning information has been transported on a basis of emergency warning notice information acquired as a result of the demodulation,
the reception apparatus starting up automatically in a case where the emergency warning notice information indicates that the emergency warning information has been transported.

2. The reception apparatus of claim 1, wherein the monitoring information includes monitoring target information indicating identification information for identifying a frequency band assigned to each service or a broadcasting network as information for specifying a service to be monitored.

3. The reception apparatus of claim 1, wherein
the monitoring information further includes tuning information,
the reception apparatus tuning to a service corresponding to the tuning information after automatic startup.

4. The reception apparatus of claim 1, wherein
the monitoring information further includes application startup information,
the reception apparatus acquiring an application corresponding to the startup information and starting the application after automatic startup.

5. The reception apparatus of claim 1, wherein
the monitoring information further includes expiration date information indicating an expiration date of the monitoring information,
the reception apparatus updating the acquired monitoring information on a basis of the expiration date information.

6. The reception apparatus of claim 1, wherein
the monitoring information includes one or a plurality of services as services to be monitored,
the reception apparatus selecting a service to be monitored from among the one or the plurality of services in accordance with user selection or a predetermined rule.

7. The reception apparatus of claim 1, wherein the circuitry is further configured to:
store the monitoring information acquired from the broadcast signal in a first mode of conducting normal reception, wherein
the circuitry tunes to a service to be monitored on a basis of the monitoring information stored before switching over to a second mode of remaining on standby with low power consumption.

8. The reception apparatus of claim 1, wherein the reception apparatus starts up automatically in a case where characteristic information indicating characteristics of the emergency warning information acquired as a result of the demodulation of the physical layer signalling matches with the characteristics of the reception apparatus.

9. The reception apparatus of claim 1, wherein
the physical layer frame complies with a DVB-T2 (Digital Video Broadcasting-Terrestrial 2) standard, and wherein
the physical layer signalling is L1-post signalling or IN-BAND signalling.

10. A reception method of a reception apparatus, comprising:
receiving, by the reception apparatus, a physical layer frame transported as a broadcast signal on a basis of monitoring information that is included, at least partially, in reserved bits of a message in upper layer signalling, signalling in a layer higher than a physical layer, and that is used to monitor a specific service; and
demodulating, by the reception apparatus, physical layer signalling acquired from the physical layer frame; and
monitoring, by the reception apparatus, whether emergency warning information has been transported on a basis of emergency warning notice information acquired as a result of the demodulation, the reception apparatus starting up automatically in a case where the emergency warning notice information indicates that the emergency warning information has been transported.

11. A transmission apparatus comprising:
circuitry configured to
generate a physical layer frame including physical layer signalling and including, in a data portion thereof, upper layer signalling, signalling in a layer higher than the physical layer; and
transmit the physical layer frame as a broadcast signal, wherein
the physical layer signalling includes emergency warning notice information corresponding to whether emergency warning information has been transported, and wherein
the upper layer signalling includes, at least partially, in reserved bits of a message transmitted therethrough monitoring information for monitoring a specific service.

12. The transmission apparatus of claim 11, wherein the monitoring information includes monitoring target information indicating identification information for identifying a frequency band assigned to each service or a broadcasting network as information for specifying a service to be monitored.

13. The transmission apparatus of claim 11, wherein the monitoring information further includes tuning information.

14. The transmission apparatus of claim 11, wherein the monitoring information further includes application startup information.

15. The transmission apparatus of claim 11, wherein the monitoring information further includes expiration date information indicating an expiration date of the monitoring information.

16. The transmission apparatus of claim 11, wherein the monitoring information includes one or a plurality of services as services to be monitored.

17. The transmission apparatus of claim 11, wherein the physical layer signalling further includes characteristic information indicating characteristics of the emergency warning information.

18. The transmission apparatus of claim 11, wherein the physical layer frame complies with a DVB-T2 (Digital Video Broadcasting-Terrestrial 2) standard, and wherein
the physical layer signalling is L1-post signalling or IN-BAND signalling.

19. A transmission method of a transmission apparatus, comprising:
generating, by the transmission apparatus, a physical layer frame including physical layer signalling that includes emergency warning notice information corresponding to whether emergency warning information has been transported and including, in a data portion thereof, upper layer signalling that includes, at least partially, in reserved bits of a message transmitted therethrough monitoring information for monitoring a specific service as signalling in a layer higher than the physical layer; and
transmitting, by the transmission apparatus, the physical layer frame as a broadcast signal.

* * * * *